US012227008B2

(12) United States Patent
Onishi et al.

(10) Patent No.: US 12,227,008 B2
(45) Date of Patent: Feb. 18, 2025

(54) FLOW PASSAGE FORMING MEMBER, LIQUID EJECTING HEAD, LIQUID EJECTING APPARATUS, METHOD OF PRODUCING FLOW PASSAGE FORMING MEMBER, AND METHOD OF PRODUCING LIQUID EJECTING HEAD

(71) Applicant: SEIKO EPSON CORPORATION, Tokyo (JP)

(72) Inventors: Hajime Onishi, Chino (JP); Taisuke Nakashima, Chino (JP); Yasutaka Matsumoto, Suwa (JP); Yutaka Yamazaki, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 207 days.

(21) Appl. No.: 18/086,700

(22) Filed: Dec. 22, 2022

(65) Prior Publication Data

US 2023/0202174 A1 Jun. 29, 2023

(30) Foreign Application Priority Data

Dec. 23, 2021 (JP) ................................ 2021-209011

(51) Int. Cl.

| | |
|---|---|
| ***B41J 2/14*** | (2006.01) |
| ***G03G 5/06*** | (2006.01) |
| ***G03G 5/082*** | (2006.01) |
| ***G03G 8/00*** | (2006.01) |
| ***G03G 15/01*** | (2006.01) |

(52) U.S. Cl.

CPC ........ *B41J 2/14201* (2013.01); *G03G 5/0662* (2013.01); *G03G 5/08228* (2013.01); *G03G 8/00* (2013.01); *G03G 15/0105* (2013.01); *G03G 2215/2048* (2013.01)

(58) Field of Classification Search

CPC .... B41J 2/14201; B41J 2/1635; B41J 2/1642; B41J 2/1643; B41J 2002/14241; B41J 2002/14491; B41J 2/14233; B41J 2/1623; B41J 2/1629; B41J 2/1646; B41J 2002/14419; B41J 2/161; G03G 5/0662; G03G 5/08228; G03G 8/00; G03G 15/0105; G03G 2215/2048

See application file for complete search history.

(56) References Cited

U.S. PATENT DOCUMENTS 7,101,026 B2 * 9/2006 Shimada ............. B41J 2/14233 347/68

FOREIGN PATENT DOCUMENTS

JP 2014-124887 A 7/2014

* cited by examiner

*Primary Examiner* — Bradley W Thies

(74) *Attorney, Agent, or Firm* — Harness, Dickey & Pierce, P.L.C.

(57) ABSTRACT

A flow passage forming member includes flow passage forming member main bodies 140 and 146 that are formed of a resin material and define at least a part of a flow passage, a metal protective film 200 that is provided on a surface of the flow passage forming member main body 140 and a surface of the flow passage forming member main body 146 defining at least the flow passage and is formed of a metal material, and a protective film 210 that is laminated on the metal protective film 200 and contains an oxide or a nitride of at least on element selected from the group consisting of tantalum (Ta), titanium (Ti), zirconium (Zr), niobium (Nb), vanadium (V), hafnium (Hf), silicon (Si), aluminum (Al), tungsten (W), and yttrium (Y).

14 Claims, 15 Drawing Sheets

FLOW PASSAGE FORMING MEMBER, LIQUID EJECTING HEAD, LIQUID EJECTING APPARATUS, METHOD OF PRODUCING FLOW PASSAGE FORMING MEMBER, AND METHOD OF PRODUCING LIQUID EJECTING HEAD

The present application is based on, and claims priority from JP Application Serial Number 2021-209011, filed Dec. 23, 2021, the disclosure of which is hereby incorporated by reference herein in its entirety.

BACKGROUND

1. Technical Field

The present disclosure relates to a flow passage forming member where a flow passage is formed, a liquid ejecting head including a flow passage forming member, a liquid ejecting apparatus including a liquid ejecting head, a method of producing a flow passage forming member, and a method of producing a liquid ejecting head.

2. Related Art

An ink jet recording head which is an example of a liquid ejecting head includes a piezoelectric actuator on one surface side of a flow passage forming substrate provided with a pressure chamber communicating with a nozzle, in which the piezoelectric actuator is driven to modify a vibration plate so that a change in pressure against the ink in the pressure chamber is made. Therefore, ink droplets are ejected from the nozzle. Further, the ink jet recording head includes a flow passage forming member that is formed of a resin material and defines a flow passage (for example, see JP-A-2014-124887).

In such an ink jet recording head, a protective film having liquid resistance is provided on an inner wall of a flow passage of a pressure chamber or the like in order to prevent a flow passage forming substrate from being eroded by the ink.

However, since the flow passage forming member formed of a resin material has low liquid resistance to a liquid containing an acidic, basic, or organic solvent, there is a problem in that the flow passage forming member is eroded or swollen by a liquid.

Therefore, a protective film with high liquid resistance is required to be provided on the inner surface of the flow passage of the flow passage forming member, but there is a problem in that pinholes are generated in the protective film depending on the film forming method and the protective film falls off with particles, which are contained in a resin material but are not formed of a resin material, that is, a so-called filler and thus the flow passage forming member is difficult to protect from a liquid.

Further, such a problem is not limited to a liquid ejecting head represented by an ink jet recording head and may also occur in a flow passage forming member used for other devices.

SUMMARY

According to an aspect of the present disclosure, there is provided a flow passage forming member including a flow passage forming member main body that is formed of a resin material and defines at least a part of a flow passage, a metal protective film that is provided on a surface of the flow passage forming member main body defining at least the flow passage and is formed of a metal material, and a protective film that is laminated on the metal protective film and contains an oxide or a nitride of at least one element selected from the group consisting of tantalum (Ta), titanium (Ti), zirconium (Zr), niobium (Nb), vanadium (V), hafnium (Hf), silicon (Si), aluminum (Al), tungsten (W), and yttrium (Y).

Further, according to another aspect of the present disclosure, there is provided a liquid ejecting head including the flow passage forming member described above.

Further, according to still another aspect of the present disclosure, there is provided a liquid ejecting apparatus including the liquid ejecting head described above.

Further, according to even still another aspect of the present disclosure, there is provided a method of producing a flow passage forming member, including forming a metal protective film formed of a metal material at a surface of a flow passage forming member main body that is formed of a resin material and defines at least a part of a flow passage, the surface defining the flow passage, and forming a protective film that contains an oxide or a nitride of at least one element selected from the group consisting of tantalum (Ta), titanium (Ti), zirconium (Zr), niobium (Nb), vanadium (V), hafnium (Hf), silicon (Si), aluminum (Al), tungsten (W), and yttrium (Y), at the metal protective film using an atomic layer deposition method.

Further, according to even still another aspect of the present disclosure, there is provided a method of producing a liquid ejecting head, including the method of producing a flow passage forming member described above.

DESCRIPTION OF EXEMPLARY EMBODIMENTS

Figure 1:
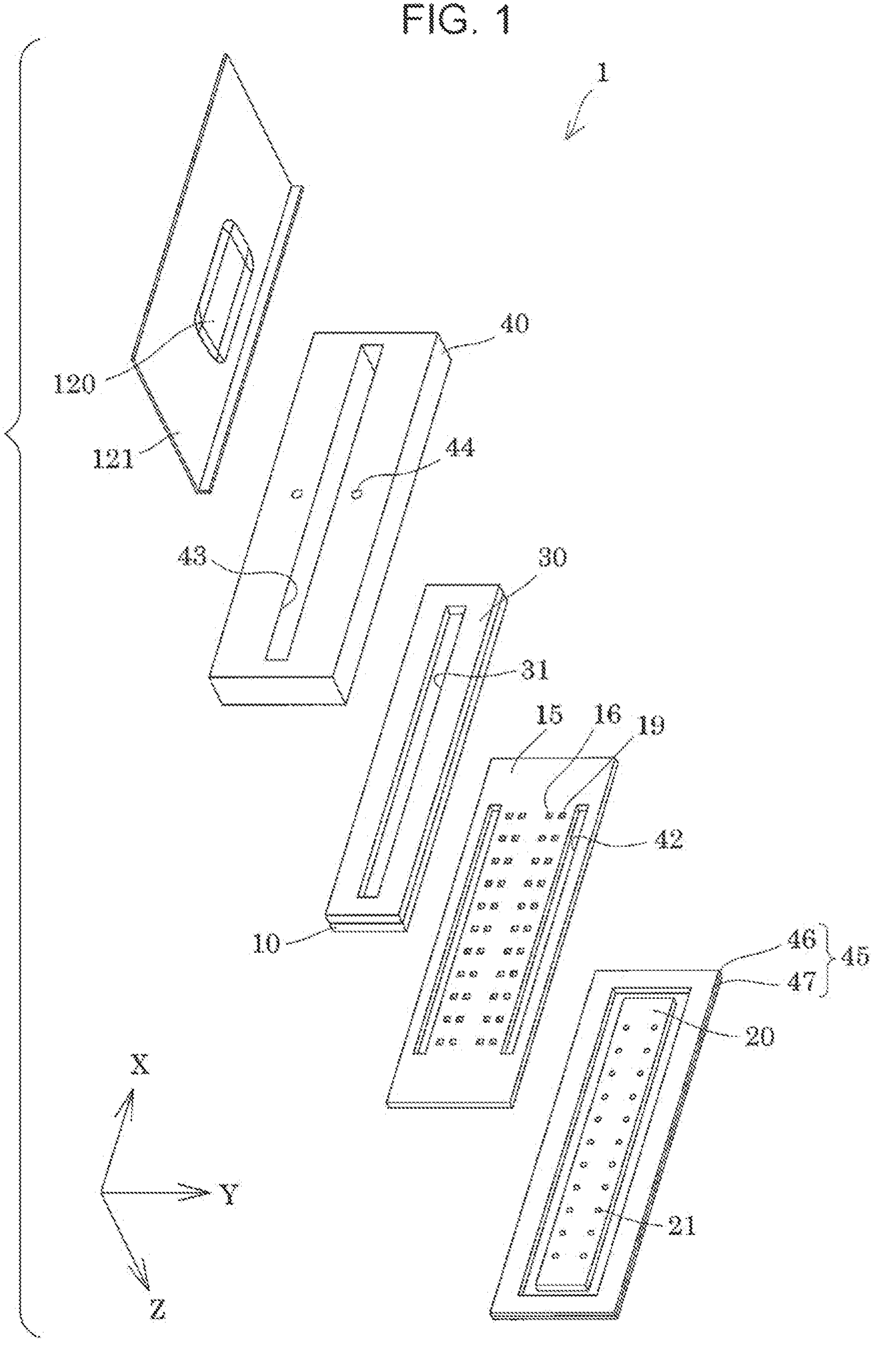
FIG. 1 is an exploded perspective view showing a recording head according to Embodiment 1.

Hereinafter, the present disclosure will be described in detail based on embodiments. Here, the description below is made to show an aspect of the present disclosure and modifications can be optionally made within a range of the present disclosure. In each view, members denoted by the same reference numerals denote the same member and the description thereof will be omitted as appropriate. Further, X, Y, and Z in each view represent three spatial axes orthogonal to each other. In the present specification, directions along the axes are defined as an X direction, a Y direction, and a Z direction. A direction in which an arrow of each view is oriented is defined as a positive (+) direction, and a direction opposite to the direction of an arrow is described as a negative (−) direction. Further, the three spatial axes that are not limited to the positive direction and the negative direction are described as an X-axis, a Y-axis, and a Z-axis.

Embodiment 1

Figure 2:
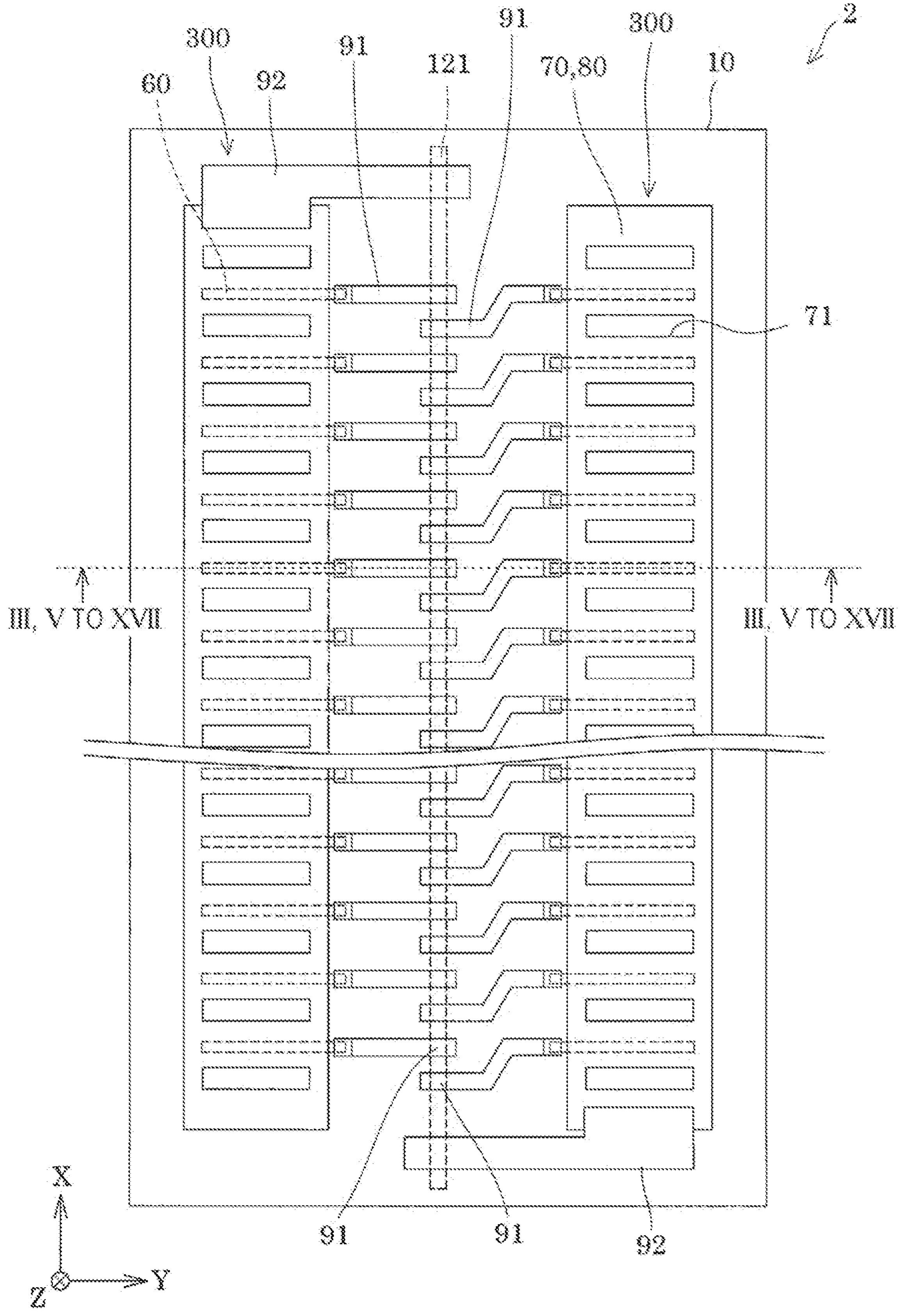
FIG. 2 is a plan view showing a flow passage forming substrate of the recording head according to Embodiment 1.
Figure 3:
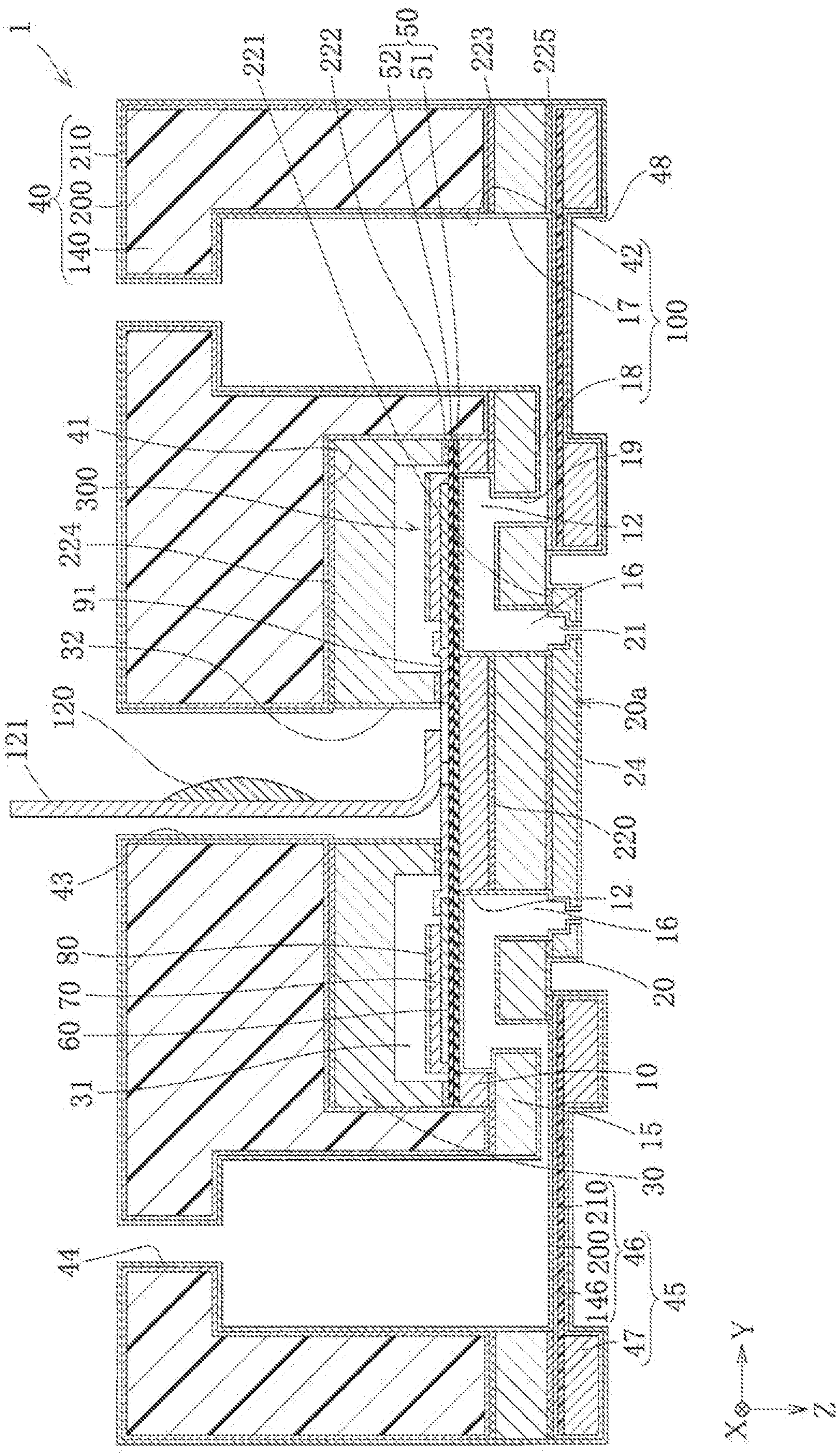
FIG. 3 is a cross-sectional view showing the recording head according to Embodiment 1.
Figure 4:
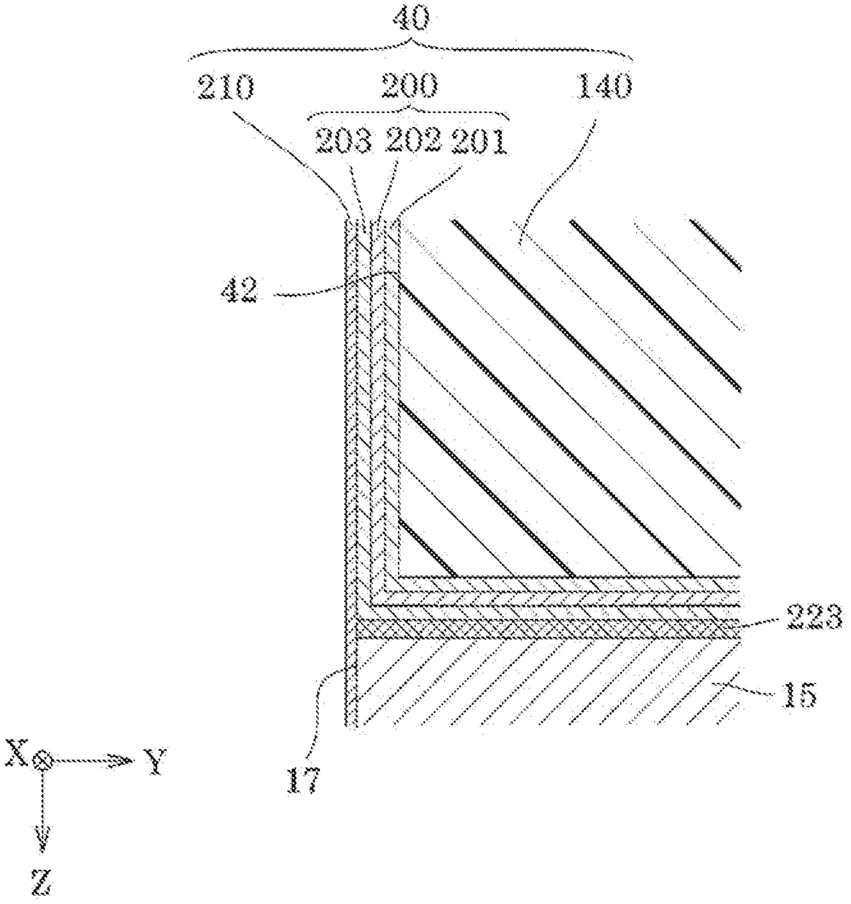
FIG. 4 is an enlarged cross-sectional view showing a main part of the recording head according to Embodiment 1.

FIG. 1 is an exploded perspective view showing an ink jet recording head 1 which is an example of a liquid ejecting head according to Embodiment 1. FIG. 2 is a plan view showing a flow passage forming substrate 10 of the ink jet recording head 1 when viewed in a +Z direction. FIG. 3 is a cross-sectional view taken along line III-III of FIG. 2. FIG. 4 is an enlarged view showing a main part of FIG. 3.

As shown in the figures, the ink jet recording head 1 according to the present embodiment (hereinafter, also simply referred to as the recording head 1) includes a plurality of members such as the flow passage forming substrate 10, a communication plate 15, a nozzle plate 20, a protective substrate 30, a case member 40, and a compliance substrate, and the plurality of these members are bonded to each other with an adhesive or the like. An epoxy adhesive, a silicone adhesive, or the like is frequently used as the adhesive. In the present embodiment, the flow passage forming substrate 10, the communication plate 15, the nozzle plate 20, and the protective substrate 30 are formed of a silicon substrate typified by a silicon single crystal substrate, as will be described in detail below. Further, at least a part of the case member 40 or the compliance substrate 45 is formed of a resin material from the viewpoints of ease of production, a small Young's modulus, and excellent compliance suitability.

In the present embodiment, the flow passage forming substrate 10 is formed of a silicon single crystal substrate. In the flow passage forming substrate 10, a plurality of pressure chambers 12 are provided with a plurality of nozzles 21 jetting ink of the same color such that the nozzles are arranged in parallel in a direction along the X-axis. Further, in the flow passage forming substrate 10, the pressure chambers 12 are arranged in rows in parallel in the direction along the X direction and in a plurality of rows, two rows in the present embodiment, in a direction along a Y-axis.

Further, the communication plate 15 is adhered to a surface of the flow passage forming substrate 10 on a side of the +Z direction via an adhesive 220. Further, the nozzle plate 20 in which a plurality of nozzles 21 communicating with each of the pressure chambers 12 are punched is adhered to a surface of the communication plate 15 on a side of the +Z direction via an adhesive 221. The communication plate 15 is provided with a nozzle communication passage 16 coupling the pressure chamber 12 with the nozzle 21. The communication plate 15 has an area greater than the area of the flow passage forming substrate 10, and the nozzle plate 20 has an area less than the area of the flow passage forming substrate 10. The cost can be reduced by setting the area of the nozzle plate 20 to be relatively small as described above. Further, in the present embodiment, a surface of the nozzle plate 20 where the nozzles 21 are opened and ink droplets are jetted is referred to as a liquid ejecting surface 2*a*.

Further, the communication plate 15 is provided with a first manifold portion 17 and a second manifold portion 18 which constitute a part of a manifold 100 serving as "common liquid chamber" communicating the plurality of the pressure chambers 12 in common.

The first manifold portion 17 is provided to penetrate the communication plate 15 in a direction along the Z-axis. The second manifold portion 18 is provided by being opened in the communication plate on a side of the liquid ejecting surface 20*a* without penetrating the communication plate 15 in the direction along the Z-axis.

Further, the communication plate 15 is formed such that a supply communication passage 19 communicating with the pressure chamber 12 on one end side in a direction along the Y-axis is provided independently from each of the pressure chambers 12. The supply communication passage 19 communicates the second manifold portion 18 with the pressure chamber 12. That is, in the present embodiment, the supply communication passage 19, the pressure chamber 12, and the nozzle communication passage 16 are provided as individual flow passages provided for each nozzle 21.

As such a communication plate 15, a material having the same linear expansion coefficient as that of the flow passage forming substrate 10 is preferable. That is, when a material having a linear expansion coefficient greater than that of the flow passage forming substrate 10 is used as the communication plate 15, the flow passage forming substrate 10 and the communication plate 15 are warped due to the difference in linear expansion coefficient in a case of being heated or cooled, and the warp of the flow passage forming substrate 10 and the communication plate 15 causes peeling or breakage such as cracking. In the present embodiment, peeling or breakage can be suppressed by using the same material as the material of the flow passage forming substrate 10 as the communication plate 15, that is, a silicon single crystal substrate so that the warp due to heat is reduced.

Further, the nozzle plate 20 is formed of a silicon single crystal substrate. In this manner, occurrence of warp due to heating or cooling is reduced by setting the linear expansion coefficients of the nozzle plate 20 and the communication plate 15 to be the same as each other, and thus peeling or breakage can be suppressed.

In the nozzle plate 20, the nozzles 21 communicating via each pressure chamber 12 and each nozzle communication passage 16 are formed. That is, the nozzles 21 are arranged in rows in parallel along the X-axis and in a plurality of rows, two rows in the present embodiment, along the Y-axis. In the present embodiment, the surface of the nozzle plate 20 where the nozzles 21 are opened in the +Z direction is referred to as the liquid ejecting surface 20*a*. That is, the ink is ejected from the nozzles 21 toward the +Z direction. A liquid-repellent film 24 having liquid repellency is provided on this liquid ejecting surface 20*a*.

The liquid-repellent film 24 is not particularly limited as long as the film has liquid repellency with respect to an ink, and for example, a metal film containing a fluorine-based polymer or a molecular film of a metal alkoxide having liquid repellency can be used.

Further, the liquid-repellent film formed of a metal film containing a fluorine-based polymer can be formed, for example, by performing eutectoid directly on the liquid ejecting surface 20*a* of the nozzle plate 20.

Further, when a molecular film of a metal alkoxide is used as the liquid-repellent film, the adhesiveness between the liquid-repellent film formed of a molecular film and the nozzle plate 20 can be improved by providing, for example, a base film formed of a plasma polymerization film (plasma polymerization silicone (PPSi) film) on a side of the nozzle plate 20. The base film formed of a plasma polymerization film can be formed by polymerizing silicone with argon plasma gas. Further, the liquid-repellent film formed of a molecular film can be formed into a liquid-repellent film (silane coupling agent (SCA) film) by, for example, forming a molecular film of a metal alkoxide having liquid repellency and performing a drying treatment and an annealing treatment on the film. Further, when a molecular film of a metal alkoxide is used as a liquid-repellent film, there is an advantage that the liquid-repellent film can be formed thinner than the liquid-repellent film formed of a metal film containing a fluorine-based polymer formed by eutectoid plating even in a case where a base layer is provided and that the liquid repellency and "rub resistance" in which the liquid repellency is not degraded even when the liquid ejecting surface 20*a* is wiped during cleaning of the liquid ejecting surface 20*a* can be improved. The liquid-repellent film formed of a metal film containing a fluorine-based polymer can also be used even though "rub resistance" and "liquid repellency" are degraded.

The piezoelectric actuator 300 including a vibration plate 50, a first electrode 60, a piezoelectric layer 70, and a second electrode 80 is laminated in order on the surface of the flow passage forming substrate 10 on the side of the −Z direction. That is, the vibration plate 50, the first electrode 60, the piezoelectric layer 70, and the second electrode 80 are laminated toward the −Z direction on the surface of the flow passage forming substrate 10 on the side of the −Z direction.

The vibration plate 50 includes an elastic film 51 formed of silicon oxide provided on the side of the flow passage forming substrate 10, and an insulator film 52 formed of zirconium oxide provided on the elastic film 51. Further, the pressure chamber 12 is formed by anisotropically etching the flow passage forming substrate 10 from the surface on the side of the +Z direction, and the surface of the pressure chamber 12 in the −Z direction is defined by the elastic film. Further, the vibration plate 50 is not particularly limited, and may by formed of only the elastic film 51 or only the insulator film 52. Further, the vibration plate 50 may include other films in addition to the elastic film 51 and the insulating film 52. In addition, the material of the vibration plate 50 is not limited to those described above.

The piezoelectric actuator 300 is provided on the side of the vibration plate 50 on the side of the −Z direction. The piezoelectric actuator 300 includes the first electrode 60, the piezoelectric layer 70, and the second electrode 80 which are sequentially laminated from the side of the vibration plate 50 toward the −Z direction. The first electrode 60, the piezoelectric layer 70, and the second electrode 80 are laminated by a film forming method and a lithography method. The piezoelectric actuator 300 serves as a pressure generation unit that bends and deforms the vibration plate 50 and changes the pressure of the ink in the pressure chamber 12. Such a piezoelectric actuator 300 is also referred to as a piezoelectric element and denotes a portion including the first electrode 60, the piezoelectric layer 70, and the second electrode 80. Further, a portion of the piezoelectric layer 70 where a piezoelectric strain occurs when a voltage is applied to a space between the first electrode 60 and the second electrode 80 will be referred to as an active portion. Meanwhile, a portion of the piezoelectric layer 70 where a piezoelectric strain does not occur will be referred to as a inactive portion. In the present embodiment, one active portion is formed for each pressure chamber 12. Two or more active portions may be provided for each pressure chamber 12. Further, one electrode is typically formed into an individual electrode independent for the piezoelectric actuator 300 and substantially each active portion, and the other electrode is formed into a common electrode substantially common to a plurality of piezoelectric actuators 300 and substantially a plurality of active portions. In the present embodiment, the first electrode 60 constitutes an individual electrode, and the second electrode 80 constitutes a common electrode. Here, the first electrode 60 may constitute a common electrode, and the second electrode 80 may constitute an individual electrode. Further, when the first electrode 60 is used as a common electrode for a plurality of the piezoelectric actuators 300, the first electrode 60 may act as a vibration plate without providing any one or both of the elastic film 51 and the insulator film 52 described above.

As shown in FIG. 2, the first electrode 60 constitutes an individual electrode that is divided for each pressure chamber 12 and independent for each piezoelectric actuator 300.

As shown in FIGS. 2 and 3, the piezoelectric layer 70 is provided continuously in a direction along the X-axis with a predetermined width along the Y-axis. Further, the piezoelectric layer 70 is provided with concave portions 71 corresponding to partition walls defining the pressure chambers 12 adjacent to each other in the direction along the X-axis. Such a piezoelectric layer 70 is formed of a piezoelectric material consisting of a composite oxide with a perovskite structure represented by General Formula $ABO_3$. Examples of the piezoelectric material used for the piezoelectric layer 70 include lead zirconate titanate.

As shown in FIGS. 2 and 3, the second electrode 80 is provided continuously on the surface of the piezoelectric layer 70 on the side of the −Z direction which is the side opposite to the side of the first electrode 60 and constitutes a common electrode common to the plurality of piezoelectric actuators 300. The second electrode 80 is provided continuously in the +X direction with a predetermined width in the +Y direction. Further, the second electrode 80 is provided on the inner surface of the concave portion 71, that is, on the side surface of the concave portion 71 and on the insulator film 52 which is the bottom surface of the concave portion 71 of the piezoelectric layer 70. Here, the second electrode 80 may be provided only on a part of the inner surface of the concave portion 71 and may not be provided over the entire surface of the inner surface of the concave portion 71.

Further, an individual lead electrode 91 which is a lead-out wire is led out from the first electrode 60. A plurality of the individual lead electrodes 91 extends along the Y-axis and are provided in parallel in the +X direction.

Further, the common lead electrode 92 which is a lead-out wire is led out from the second electrode 80. The common lead electrode 92 extends along the Y-axis and is led out from both end portions of the rows of the piezoelectric actuators 300 in the X-axis toward between two rows of the piezoelectric actuators 300 in the Y-axis.

The protective substrate 30 having approximately the same size as the size of the flow passage forming substrate 10 is adhered to the surface of the flow passage forming substrate 10 on the side of the −Z direction via the adhesive 222. The protective substrate 30 includes a holding portion 31 that is a space for protecting the piezoelectric actuator 300. The holding portion 31 is provided independently for each of the piezoelectric actuators 300 arranged in parallel in the +Z direction, and two of the holding portions 31 are formed in parallel in the +Y direction. Further, a through-hole 32 penetrating into a space between the two holding portions 31 arranged in parallel in the +Y direction in the +Z direction is provided in the protective substrate 30. The end portions of the individual lead electrode 91 and the common lead electrode 92 led out from the electrodes of the piezoelectric actuator 300 extend to be exposed to the inside of the through-hole 32. It is preferable that such a protective substrate 30 be formed of a material having the same linear expansion coefficient as that of the flow passage forming substrate 10 to which the protective substrate 30 is adhered, and a silicon single crystal substrate is used as the material in the present embodiment.

As shown in FIG. 3, a case member 40 that defines the manifold 100 communicating the plurality of pressure chambers 12 together with the flow passage forming substrate 10, the communication plate 15, and the like is fixed to the protective substrate 30 on the side of the −Z direction. The case member 40 has approximately the same shape as that of the communication plate 15 described above in plan view and is bonded to the communication plate 15 via the adhesive 223. Further, the case member 40 and the protective substrate 30 are bonded to each other via the adhesive 224.

Such a case member 40 has a concave portion 41 that is opened in the surface on the side of the +Z direction and that has a depth at which the flow passage forming substrate 10 and the protective substrate 30 are accommodated. The concave portion 41 has an opening area greater than the area of the surface of the protective substrate 30 bonded to the flow passage forming substrate 10. Further, the opening surface of the concave portion 41 on the side of the nozzle plate 20 is sealed with the communication plate 15 in a state where the flow passage forming substrate 10, the protective substrate 30, and the like are accommodated in the concave portion 41. Further, a third manifold portion 42 which is a groove that is opened in the +direction is provided on both outsides of the concave portion 41 along the Y-axis, that is, in both the +Y direction and the −Y direction. The third manifold portion 42 has approximately the same opening area as the area of the opening of the first manifold portion 17 provided on the communication plate 15 on the side of the −Z direction, and the case member 40 is bonded to the communication plate 15, the third manifold portion 42 communicates with the first manifold portion 17. The manifold 100 of the present embodiment is formed by the third manifold portion 42 provided on the case member 40 and the first manifold portion 17 and the second manifold 18 provided on the communication plate 15. The manifold 100 is provided continuously in the +X direction in which the pressure chambers 12 are arranged in parallel, and the supply communication passages 19 communicating each pressure chamber 12 with the manifold 100 are arranged in parallel in the +X direction.

Further, in the case member 40, the introduction passage 44 which is a groove for supplying the ink to each manifold 100 by communicating with the manifold 100 is provided on the third manifold portion 42 on the side of the −Z direction. Further, the case member 40 is provided with a coupling port 43 which communicates with the through-hole 32 of the protective substrate 30 and into which a wire substrate 121 is inserted.

Such a case member 40 includes a case member main body 140 formed of a resin material, a metal protective film 200 provided on the case member main body 140 and described below in detail, and a protective film 210 laminated on the metal protective film 200 and described below in detail. Further, the flow passage of the third manifold portion 42, the introduction passage 44, and the like are actually provided on the case member main body 140, and the metal protective film 200 and the protective film 210 are formed at the inner surface of the flow passage of the third manifold portion 42 and the introduction passage 44 provided on each case member main body 140.

Examples of the resin material forming the case member main body 140 include a polyphenylene sulfide (PPS) resin, an ABS resin, polycarbonate, a polyamide resin, a phenol resin, an epoxy resin, and a modified polyphenylene ether resin. This case member main body 140 of the present embodiment corresponds to "flow passage forming member main body" that is formed of the resin material and defines the flow passage.

Further, the third manifold portion 42 and the introduction passage 44 which are flow passages provided on the case member main body 140 consist of "grooves" and have an aspect ratio of 2 or greater. Here, the concept of groove includes a concave portion having an opened surface and a through-hole. Further, the aspect ratio is a ratio (L/D) obtained by dividing a hole depth (L) by a hole diameter (D). For example, when the opening of the third manifold portion 42 in the +Z direction has a rectangular shape, the radius (r) is calculated from the equation of "opening area (S) $=\pi r^2$" and the hole diameter (D) may be obtained by multiplying the radius (r) by two. In the present embodiment, for example, the opening area (S) of the third manifold portion 42 is 120 $mm^2$ and the depth (L) thereof is 25 mm. Therefore, when the opening area (S) of the third manifold portion 42 is converted to the hole diameter (D), the value is 12.4 mm and the aspect ratio is 2.02. The aspect ratio is 2.02 in a case of a concave portion without the introduction passage 44. Further, when one introduction passage 44 is provided on the third manifold portion 42, the opening area (S) of the introduction passage 44 is 1 $mm^2$ and the depth (1) thereof is 5 mm. Therefore, when the opening area (S) of the introduction passage 44 is converted to the hole diameter (D), the value is 1.12, and $(2.02\times25+4.46\times5)/30$ is obtained when the aspect ratio is acquired by averaging the introduction passage 44 and the third manifold portion 42 according to the length in the through-hole direction, and the aspect ratio is 2.43. Further, the aspect ratio here denotes the aspect ratio of "concave portion" that is the third manifold portion 42 or the introduction passage 44 of the case member main body 140 that is not provided with the metal protective film 200 and the protective film 210 described below in detail.

The compliance substrate 45 is bonded to the surface of the communication plate 15 via the adhesive 225 on the side of the liquid ejecting surface **20*a* in which the first manifold portion 17 and the second manifold 18 are opened. The opening of the first manifold portion 17 and the second manifold 18 on the side of the liquid ejecting surface 20*a* is sealed with the compliance substrate 45**.

In the present embodiment, such a compliance substrate 45 includes a sealing film 46 and a fixed substrate 47. The sealing film 46 includes a sealing film main body 146 of a thin film which is formed of a resin material and has flexibility, a metal protective film 200 described in detail below which is provided on the sealing film main body 146, and a protective film 210 described in detail below which is laminated on the metal protective film 200. Further, when the ink resistance of the sealing film main body 146 is high, the sealing film may be formed of only the sealing film main body 146 that is not provided with the metal protective film 200 and the protective film 210, but it is preferable that the sealing film 46 be configured not to have the metal protective film 200, that is, configured only the sealing film main body 146 and the protective film 210. In the sealing film 46 of the present embodiment, the surface of the sealing film main body 146 on the side of the −Z direction defines a part of the first manifold portion 17 and the second manifold 18, which are flow passages, and the metal protective film 200 and the protective film 210 are formed on the surface defining the first manifold portion 17 and the second manifold portion 18. As the resin material forming the sealing main body, the same material as the material of the case member main body 140, that is, a polyphenylene sulfide (PPS) resin, an ABS resin, polycarbonate, a polyamide resin, a phenol resin, an epoxy resin, a modified polyphenylene ether resin, or the like can be used. Further, it is preferable that the thickness of the sealing film main body 146 be set to 20 μm or less. The flexibility of the sealing film main body 146 is ensured by setting the thickness of the sealing film main body 146 to 20 μm, and thus a change in pressure of the ink in the manifold 100 can be reduced by deformation of the sealing film main body 146.

The fixed substrate 47 is formed of a hard material such as a metal such as stainless steel (SUS) or a resin. Since the region of the fixed substrate 47 which faces the manifold 100 is the opening portion 48 completely removed in the thickness direction, and thus one surface of the manifold 100 is a compliance portion which is a flexible portion sealed with only the sealing film 46 having flexibility. Therefore, the sealing film main body 146 in the sealing film 46 of the compliance substrate 45 according to the present embodiment corresponds to "flow passage forming member" that is formed of the resin material and defines the flow passage. Here, the sealing film main body 146 is not limited to being formed of the resin material and may be formed of a metal material such as stainless steel. When the sealing film main body 146 is formed of the metal material, the sealing film main body 146 does not correspond to "flow passage forming member".

The recording head 1 with such a configuration takes the ink in via the introduction passage 44 from an ink storage unit such as a cartridge during the ejection of the ink, and the inside of the flow passage from the manifold 100 to the nozzle 21 is filled with the ink. Thereafter, the vibration plate 50 is bent and deformed together with the piezoelectric actuator 300 by applying a voltage to each piezoelectric actuator 300 corresponding to the pressure chamber 12 according to a signal from a driving circuit 120. In this manner, the pressure inside the pressure chamber 12 increases so that the ink droplets are ejected toward the +Z direction from a predetermined nozzle 21.

Here, as shown in FIGS. 3 and 4, the metal protective film 200 formed of a metal material and the protective film having liquid resistance are sequentially laminated on the surface that defines at least the flow passage of the case member main body 140, that is, the surface that defines the introduction passage 44 and the third manifold portion 42. That is, the metal protective film 200 is provided on the side of the case member main body 140 and the protective film 210 is provided on the side of the metal protective film 200 opposite to the case member main body 140. In the present embodiment, the metal protective film 200 is provided continuously over the entire surface of the case member main body 140. Further, the protective film 210 is provided on the surfaces other than the surfaces bonded to other members of the case member main body 140, that is, the surfaces other than the surfaces bonded to the protective substrate 30 and the communication plate 15 of the case member main body 140, that is, the inner surface of the third manifold portion 42 and the introduction passage 44 which are flow passages, the inner surface of the coupling port 43, the surface of the case member main body 140 in the −Z direction, and the outer surface of the case member main body 140 along the Z-axis.

Further, the metal protective film 200 formed of the same metal material as the material of the case member main body 140 and the protective film 210 having liquid resistance are laminated in order on the surface defining at least the flow passage of the sealing film main body 146, that is, the surface defining the first manifold portion 17 and the second manifold portion 18. In other words, the metal protective film 200 is provided on the side of the sealing film main body 146 and the protective film 210 is provided on the side of the metal protective film 200 opposite to the sealing film main body 146. In the present embodiment, the metal protective film 200 is formed continuously over the entire surface of the bonded material to which the sealing film main body 146 and the fixed substrate 47 are bonded. Further, the protective film 210 is provided on the surfaces other than the surface of the bonded material bonded to the communication plate 15, that is, the surface defining the first manifold portion 17 and the second manifold portion 18, the inner surface of the opening portion 48, the surface in the +Z direction, and the outer surface of the bonded material along the Z-axis. The metal protective film 200 may be formed at the sealing film main body 146, but it is preferable that the metal protective film 200 and the protective film 210 be not provided from the viewpoint of the flexibility. Therefore, when the ink resistance of the sealing film main body 146 is not problematic, only the protective film 210 may be provided on the sealing film main body 146 without providing the metal protective film 200 or both the metal protective film 200 and the protective film 210 may not be formed.

Further, the protective film 210 expands from the surface where the case member main body 140 and the sealing film main body 146 define the flow passage to the inner surfaces of the flow passages of other members. In other words, the protective film 210 expands to the inner surfaces defining the flow passages of the communication plate 15, the flow passage forming substrate 10, and the nozzle plate 20, that is, the inner surfaces of the first manifold portion 17, the second manifold portion 18, the supply communication passage 19, the pressure chamber 12, the nozzle communication passage 16, and the nozzle 21. Therefore, the protective film 210 of the present embodiment is provided continuously without being cut over the inner surfaces of the flow passages of the recording head 1, that is, the inner surfaces of the introduction passage 44, the manifold 100, the supply communication passage 19, the pressure chamber 12, the nozzle communication passage 16, and the nozzle 21. Further, in the present embodiment, the protective film 210 is provided even on the surfaces of the adhesives 220 to 225, used to adhere each member constituting the recording head 1, on the side of the flow passage. That is, the protective film 210 is provided continuously over the surface defining the flow passage of the case member main body 140 formed of the resin material and the sealing film main body 146, the adherend member formed of a material other than the resin material, the surface defining the flow passage of the communication plate 15 in the present embodiment, and the surfaces of the adhesives 224 and 225 used to bond these members.

Such a metal protective film 200 is formed of a single layer formed of a single material or a composite material of the metal material or a laminated film obtained by laminating a plurality of materials. In the present embodiment, as shown in FIG. 4, the metal protective film 200 is formed by laminating a first metal protective film 201, a second metal protective film 202, and a third metal protective film 203 in this order from the side of the flow passage forming member. That is, the metal protective film 200 has the third metal protective film 203 serving as "upper layer" on the side of the protective film 210 and has the second metal protective film 202 serving as "lower layer" on the side of the case member main body 140 and the sealing film main body 146 which are the flow passage forming member main bodies with respect to the third metal protective film 203. Further, the metal protective film 200 has the first metal protective film 201 serving as "lowermost layer" on the side of the case member main body 140 and the sealing film main body 146 which are the flow passage forming member main bodies.

Examples of the metal material used for the first metal protective film 201 include nickel (Ni), copper (Cu), gold (Au), silver (Ag), and platinum (Pt). The first metal protective film 201 can be formed at a low cost by using nickel (Ni) and copper (Cu). Further, examples of the nickel (Ni) used for the first metal protective film 201 include nickel boron (Ni—B) containing boron (B) and nickel phosphorus (Ni—P) containing phosphorus (P). When the first metal protective film 201 contains at least one of nickel boron or nickel phosphorus, it is possible to improve the liquid resistance of the first metal protective film 201 and suppress the case member main body 140 and the sealing film main body 146 from being eroded or swollen by the ink. Since the erosion and swelling cause various problems such as destruction of inner portions of members and the bonding portion due to a change in dimensions, peeling of the bonding portion due to a decrease in bonding strength of the bonding portion, outflow of the liquid due to dissolution of members, and the like in addition to degradation of dimension accuracy, occurrence of such problems can be suppressed.

It is preferable that such a first metal protective film 201 be formed by electroless plating. When the first metal protective film 201 is formed by electroless plating, the first metal protective film 201 can be easily formed at the inner surface of the third manifold portion 42 and the introduction passage 44 even in a case where the aspect ratio of the third manifold portion 42 and the introduction passage 44 which are flow passages provided on the case member main body 140 is 2 or greater.

Further, it is preferable that the first metal protective film 201 be an alloy containing nickel and boron. The reason for this is that the liquid temperature during film formation of nickel boron by electroless plating is lower than the liquid temperature during film formation of nickel phosphorous by electroless plating in many cases. The reason for this is that the film forming speed of the electroless nickel boron (Ni—B) plating (also known as electroless nickel boron plating) is higher than that of the electroless nickel phosphorus (Ni—P) plating. Therefore, when the first metal protective film 201 is formed by electroless nickel boron plating, it is possible to suppress the case member main body 140 and the sealing film main body 146, which are formed of the resin material, from being deformed due to the heat generated during the electroless plating. Here, when the first metal protective film 201 is formed by electroless nickel boron plating, since a strong tensile stress is generated as an internal stress of the formed film, cracking or peeling of the film easily occurs in a case where the film thickness is large. Accordingly, when the first metal protective film 201 is formed by electroless nickel boron plating, it is preferable that the thickness of the first metal protective film 201 be set to 0.3 μm or greater and 0.5 μm or less. When the thickness of the first metal protective film 201 is set to be in the above-described range, the internal stress of the first metal protective film 201 is suppressed, and occurrence of cracks in the first metal protective film 201 and peeling of the first metal protective film 201 from the case member main body 140 and the sealing film main body 146 can be suppressed. In addition, the internal stress varies depending on the concentration of phosphorus (P) when the first metal protective film 201 is formed by electroless nickel phosphorus plating. For example, the tensile stress increases when the content of phosphorus (P) is 7% or less, and the tensile stress decreases or the compression stress increases as the content of phosphorus (P) increases. For example, the internal stress reaches approximately 0 (zero) when the content of phosphorus (P) is approximately 8.7%. Therefore, cracking of the first metal protective film 201 or peeling of the film can be made difficult to occur by adjusting the content of phosphorus (P) using an alloy containing nickel and phosphorus as the first metal protective film 201.

Examples of the metal material used for the second metal protective film 202 include copper (Cu), nickel (Ni), chromium (Cr), and zinc (Zn). It is preferable that the second metal protective film 202 be formed of copper (Cu). Since copper (Cu) has a relatively small internal stress and is soft, copper enables the second metal protective film to function as a stress relieving layer that relieves the internal stress of the metal protective film 200. In the present embodiment, copper (Cu) is used as the second metal protective film 202. It is preferable that such a second metal protective film 202 be formed by electroplating. A relatively thick film can be formed at a low cost by forming the second metal protective film 202 by electroplating. Further, it is preferable that the second metal protective film 202 be formed to have a thickness greater than the thickness of the first metal protective film 201. For example, it is preferable that the second metal protective film 202 be formed to have a thickness of 0.5 μm or greater and 10 μm or less. In this manner, when the second metal protective film 202 is provided to be thicker than the first metal protective film 201, the entire metal protective film 200 can be made relatively thick, formation of pinholes in the metal protective film 200 can be suppressed, and falling off of the metal protective film 200 together with the particles, which are contained in the resin material but are not formed of the resin material, that is, a so-called filler can be suppressed. Further, the filler is mixed with the resin material for the purpose of improving the characteristics such as the strength of the resin, the heat resistance, and various resistances, reducing the cost, and improving the color tone, and examples thereof include materials other than the resins, for example, minerals silicon oxide, aluminum oxide, and zirconium oxide, glass fibers, ceramic fibers, and carbon. The particle diameter of such a filler is, for example, in a range of 0.1 μm to 100 μm.

A metal material having high liquid resistance is preferable as the material used for the third metal protective film 203, and examples thereof include nickel (Ni), chromium (Cr), zinc (Zn), palladium (Pd), a nickel palladium alloy (Ni—Pd alloy), a nickel tin alloy (Ni—Sn alloy), a nickel zinc alloy (Ni—Zn alloy), and gold (Au). It is preferable that such a third metal protective film 203 be formed by electroplating. When the third metal protective film 203 is formed by electroplating, a relatively thick film can be formed at a low cost.

Further, it is preferable that the third metal protective film 203 have a Mohs hardness greater than that of the second metal protective film 202. Here, the Mohs hardnesses of typical metal elements are listed in Table 1.

TABLE 1

| Name of element | Symbol | Mohs hardness |
|---|---|---|
| Zinc | Zn | 2.5 |
| Aluminum | Al | 2.9 |
| Antimony | Sb | 3.0 |
| Gold | Au | 2.5-3.0 |
| Silver | Ag | 2.7 |
| Chromium | Cr | 9.0 |
| Cobalt | Co | 5.6 |
| Tin | Sn | 1.8 |
| Tungsten | W | 6.5-7.5 |
| Titanium | Ti | 4.0 |
| Iron | Fe | 4.5 |
| Copper | Cu | 3.0 |
| Lead | Pu | 1.5 |
| Nickel | Ni | 3.8 |
| Platinum | Pt | 4.3 |
| Magnesium | Mg | 2.6 |
| Manganese | Mn | 5.0 |
| Molybdenum | Mo | — |

As listed in Table 1, when as the material of the second metal protective film 202, for example, copper (Cu) is used, it is preferable that the third metal protective film 203 be formed of a material having a Mohs hardness of greater than 3.0 which is the Mohs hardness of copper (Cu), such as nickel (Ni) having a Mohs hardness of 3.8 or chromium (Cr) having a Mohs hardness of 9.0. That is, it is preferable that the first metal protective film 201 and the second metal protective film 202 corresponding to lower layers contain copper (Cu) and that the third metal protective film 203 corresponding to an upper layer contain at least one of nickel (Ni) or chromium (Cr). In this manner, the first metal protective film 201 and the second metal protective film 202 contain copper (Cu), an thus thermal conductivity of the metal protective film 200 can be improved. Further, the surface of the metal protective film 200 is unlikely to be damaged by using a material having a Mohs hardness greater than the Mohs hardness of the second metal protective film 202 for the third metal protective film 203. Particularly, when the third metal protective film 203 is formed of at least one of nickel (Ni) or chromium (Cr), significant degradation of the thermal conductivity of the metal protective film 200 can be suppressed, and the third metal protective film 203 can be easily formed by electroplating. In the present embodiment, nickel (Ni) is used as the material for the third metal protective film 203.

Further, since the third metal protective film 203 is formed at the second metal protective film 202 formed of copper (Cu), the internal stress is relieved, and thus peeling of the film is unlikely to occur. It is preferable that such a third metal protective film 203 be formed to have a thickness of 0.5 μm or greater and 10 μm or less. When the third metal protective film 203 is provided in the above-described manner, the entire thickness of the metal protective film 200 can be made relatively large, formation of pinholes in the metal protective film 200 can be suppressed, and falling off of the metal protective film 200 together with the filler contained in the resin material can be suppressed. Further, deterioration of the surface of copper (Cu) of the second metal protective film 202 can be suppressed by providing the third metal protective film 203 on the second metal protective film 202 formed of copper (Cu).

The entire thickness of the metal protective film 200 including the first metal protective film 201, the second metal protective film 202, and the third metal protective film 203 as described above is preferably 1 μm or greater. By setting the thickness of the metal protective film 200 to 1 μm or greater as described above, falling off of the filler contained in the resin material can be suppressed.

In the embodiment, the metal protective film 200 includes the first metal protective film 201, the second metal protective film 202, and the third metal protective film 203, but the configuration thereof is not particularly limited. For example, the metal protective film 200 may be configured of only the first metal protective film 201 without providing the second metal protective film 202 and the third metal protective film 203 or may be configured by laminating the first metal protective film 201 and the second metal protective film 202 without providing the third metal protective film 203. Here, when a film having a high stress is used as the first metal protective film 201, the first metal protective film 201 is required to be formed relatively thin. Therefore, when a film having a high stress is intended to be used, since a film having a small stress or a compressive stress film and a tensile stress film are easily mixed and laminated on the first metal protective film 201 by providing the second metal protective film 202 and the third metal protective film 203, the stress of the entire film can be reduced, the total film thickness of the metal protective film 200 can be set to be relatively large, and the metal protective film 200 can be made difficult to peel off from the case member 40.

Further, the film forming method for the metal protective film 200 is not limited to plating such as electroless plating or electroplating, and a sputtering method, a physical vapor deposition method (PVD method), a chemical vapor deposition method (CVD method), or the like may be used for film formation. Here, when the metal protective film 200 is formed by plating, a vacuum environment is not required, the film can be formed relatively thick at a low cost, the treatments can be carried out collectively, and thus the cost can be further reduced.

The thermal conductivity of the flow passage forming member main body formed of the resin material, that is, the case member main body 140 and the sealing film main body 146 can be improved by providing the metal protective film 200 in the above-described manner. In other words, even though the thermal conductivity of the resin material is less than that of the metal material, the thermal conductivity of the case member main body 140 and the sealing film main body 146 on the side of the surface defining the flow passage can be improved by providing the metal protective film 200 formed of the metal material on the surface defining the flow passage of the case member main body 140 and the sealing film main body 146 which are formed of the resin material. Particularly, by providing the metal protective film 200 on the inner surface of the common liquid chamber, that is, the inner surface of the third manifold portion 42 constituting a part of the manifold 100 of the case member main body and the surface defining the first manifold portion 17 and the second manifold portion 18 of the sealing film main body 146, occurrence of variation in the temperature of the ink, with which the manifold 100 is filled, in the direction along the X-axis which is the direction in which the pressure chambers 12 are provided in parallel can be suppressed. Therefore, variation in the temperature of the ink supplied to the pressure chamber 12 which is an individual flow passage from the manifold 100 can be suppressed, and variation in the viscosity based on the temperature of the ink can be prevented. Therefore, variations in ejecting characteristics of the ink ejected from each nozzle 21, that is, variations in the ink weight and the ink flying speed are suppressed so that the printing quality can be improved. Particularly, the thermal conductivity of the entire metal protective film 200 is improved by allowing the second metal protective film 202 to contain copper (Cu) as described above, and thus variations in ejecting characteristics of the ink ejected from each nozzle 21 can be suppressed.

The protective film 210 is formed at the metal protective layer 200 and on the third metal protective film 203 in the present embodiment, and is formed into a single layer formed of a single material or a composite material having liquid resistance or a laminated film obtained by laminating a plurality of materials. Here, the liquid resistance denotes etching resistance to an ink which is a basic or acidic liquid, dissolution resistance to an organic solvent, or swelling resistance. An inorganic material typically has high resistance to an organic solvent, and thus the material used in the protective film 210 with high liquid resistance to a basic or acidic liquid contains an oxide or a nitride of one element selected from the group consisting of tantalum (Ta), titanium (Ti), zirconium (Zr), niobium (Nb), vanadium (V), hafnium (Hf), silicon (Si), aluminum (Al), tungsten (W), and yttrium (Y). That is, the protective film 210 may be formed into a single layer formed of a single material or a composite material having an oxide or a nitride of the element described above or a laminated film obtained by laminating a plurality of materials.

It is preferable that the thickness of the metal film 210 be less than the thickness of the metal protective film 200. When the protective film 210 is formed to be thinner than the metal protective film 200, it is possible to suppress the protective film 210 from disturbing displacement of the sealing film 46. Further, when the protective film 210 extends on the inner surfaces of other flow passages as in the present embodiment, it is possible to suppress the protective film 210 from disturbing displacement of the vibration plate 50. Further, The thermal conductivity can be improved by forming the metal protective film 200 to have a thickness greater than the thickness of the protective film 210. Further, since the protective film is thin, degradation of the thermal conductivity can be reduced.

It is preferable that such a protective film 210 contain hafnium (Hf). Hafnium (Hf) is highly resistant to a liquid having both strong basicity and strong acidity such as hafnium oxide ($HfO_x$). Therefore, when the protective film 210 contains hafnium (Hf), it is possible to suppress the protective film 210 from being eroded by the ink and more reliably suppress the case member main body 140 and the sealing film main body 146 from being eroded or from being swollen by the ink.

Further, it is preferable that the protective film 210 contain silicon (Si). Silicon (Si) has high hydrophilicity with respect to water, that is, high wettability. Therefore, when the protective film 210 contains silicon (Si), it is possible to suppress air bubbles contained in the ink from remaining in the flow passage in a case where the flow passage is filled with the ink and to improve the air bubble discharge property. That is, in a case where air bubbles remain in the flow passage, the air bubbles function as a buffer when entering the pressure chamber 12 or the nozzle 21 at an unexpected timing and causing a change in pressure so that ejection failure, such as non-ejection of the ink or deviation of the flying direction of the ink, occurs. The air bubble discharge property in the flow passage can be improved by increasing the hydrophilicity of the protective film 210 and thus ejection failure of the ink due to air bubbles can be suppressed.

Examples of the material for forming the protective film 210 that satisfies two conditions described above include hafnium silicate ($HfSiO_x$).

Such a protective film 210 is formed by an atomic layer deposition (ALD) method. In the film formation according to the atomic layer deposition method, a film can be formed with a high film density in a dense state, the film thickness can be made uniform, and deposition on an object is greatly enhanced even when the shape of the object is significantly uneven. In this manner, the protective film 210 can be uniformly formed over the inside of minute defects such as pinholes or pits formed in the metal protective film 200, by forming the protective film 210 on the metal protective film 200 using an atomic layer deposition method. Therefore, when the protective film 210 is provided, it is possible to suppress the surface of the resin material from being exposed in the flow passage and to allow the protective film 210 to protect the resin material from the ink.

The thickness of the protective film 210 is preferably 20 nm or greater and 40 nm or less. When the thickness of the protective film 210 is less than 20 nm, the protective performance of the case member main body 140 and the sealing film main body 146 formed of the resin material may be degraded. Further, when the thickness of the protective film 210 is greater than 40 nm, film formation carried out by the atomic layer deposition method takes time and this results in an increase in the cost. That is, the members formed of the resin material can be reliably protected and the cost can be reduced by setting the thickness of the protective film 210 to 20 nm or greater and 40 nm or less.

As described above, the protective film 210 is provided continuously over the surface defining the flow passage of the case member main body 140 and the sealing film main body 146 formed of the resin material, the surface defining the flow passage of the adherend member formed of a material other than the resin material and the flow passage of the communication plate 15 in the present embodiment, and the surface of the adhesives 224 and 225 used to bond these members. Therefore, it is possible to suppress the ink from entering the bonding interface between the case member main body 140, the sealing film main body 146, and the communication plate 15 so that erosion of the members is prevented and to suppress the adhesives 224 and 225 from being eroded by the ink. Therefore, it is possible to suppress the bonding strength of members bonded to each other from being decreased due to the ink so that peeling of the members, leakage of the ink to the outside, or the like can be prevented.

Here, a method of producing the recording head 1 according to the present embodiment will be described with reference to FIGS. 5 to 17. FIGS. 5 to 17 are cross-sectional views taken along lines V to XVII-V to XVII, describing the method of producing the recording head 1.

Figure 5:
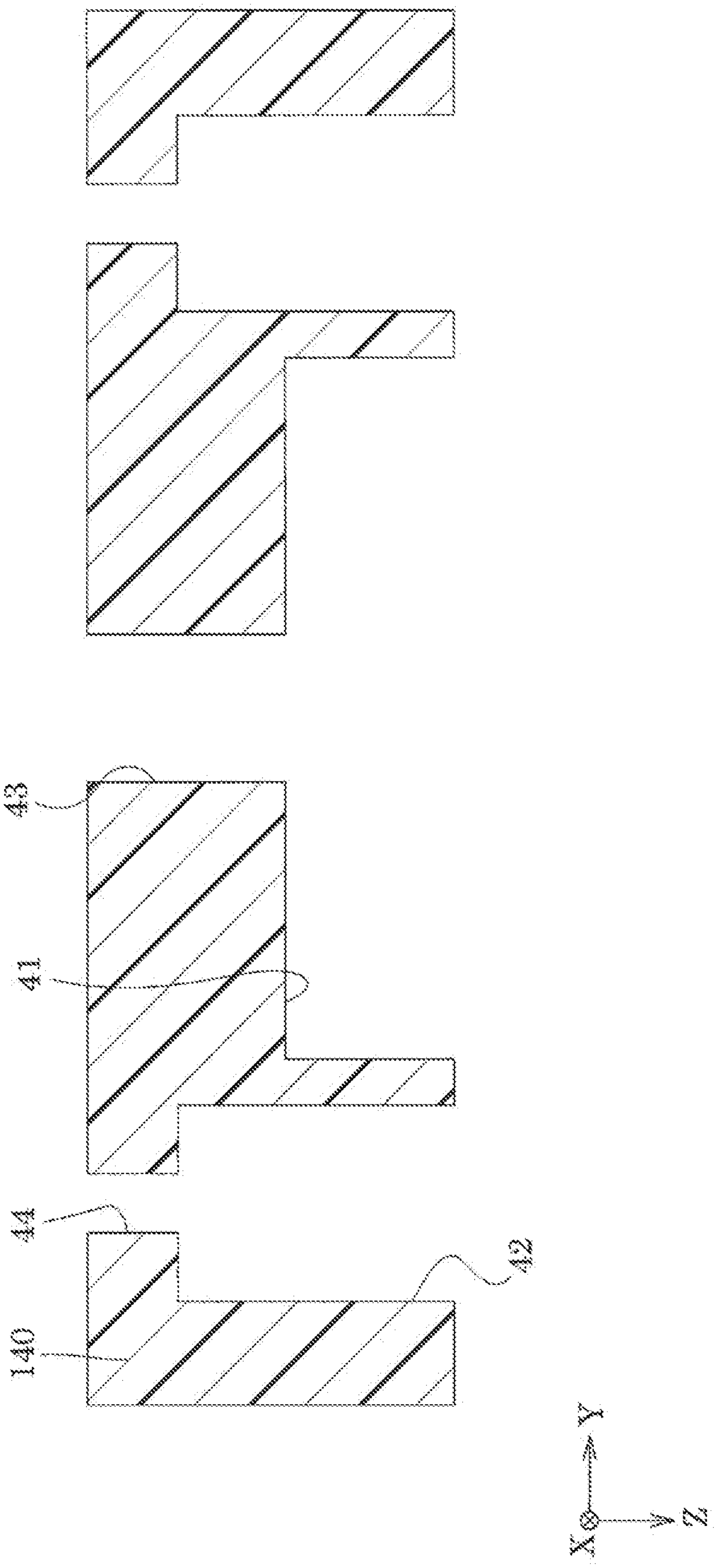
FIG. 5 is a cross-sectional view showing a method of producing the recording head according to Embodiment 1.

As shown in FIG. 5, the case member main body 140 in which the third manifold portion 42, the introduction passage 44, and the coupling port 43 are formed is formed of a resin material. The case member main body 140 can be produced at a low cast by, for example, injection molding.

The surface of the case member main body 140 is roughened by immersing the case member main body in a chromic acid solution or a permanganic acid solution so that irregularities are formed at the surface thereof. When irregularities are formed at the surface of the case member main body 140, the adhesive strength of the metal protective film 200 to be formed at the surface of the case member main body 140 in the subsequent step can be improved by the anchor effect.

Next, a catalyst during the electroless plating is made to adhere to the surface of the case member main body 140. The catalyst functions as a catalyst (activator) during the electroless plating and contains palladium (Pd) as a main component. Examples of a typical method of adhering a catalyst include a dip type method and a spray type (spin type) method, and the dip type method in the present embodiment is a method of immersing an object in a chemical solution. The spray type method is a method of spraying a chemical solution to an object from a nozzle. In the present embodiment, the catalyst of palladium (Pd) is made to adhere to the surface of the case member main body 140 by immersing the case member main body 140 in a palladium chloride aqueous solution. Since the case member main body is provided with the flow passages of the third manifold portion 42, the introduction passage 44, and the like, when the catalyst is made to adhere to the surface of the case member main body 140 by the dipping type method of immersing the case member main body 140 in a chemical solution, the catalyst can adhere to the inner surface of the flow passages of the case member main body 140 and the like, the treatments can be carried out collectively, and thus the efficiency of the production process can be improved.

Figure 6:
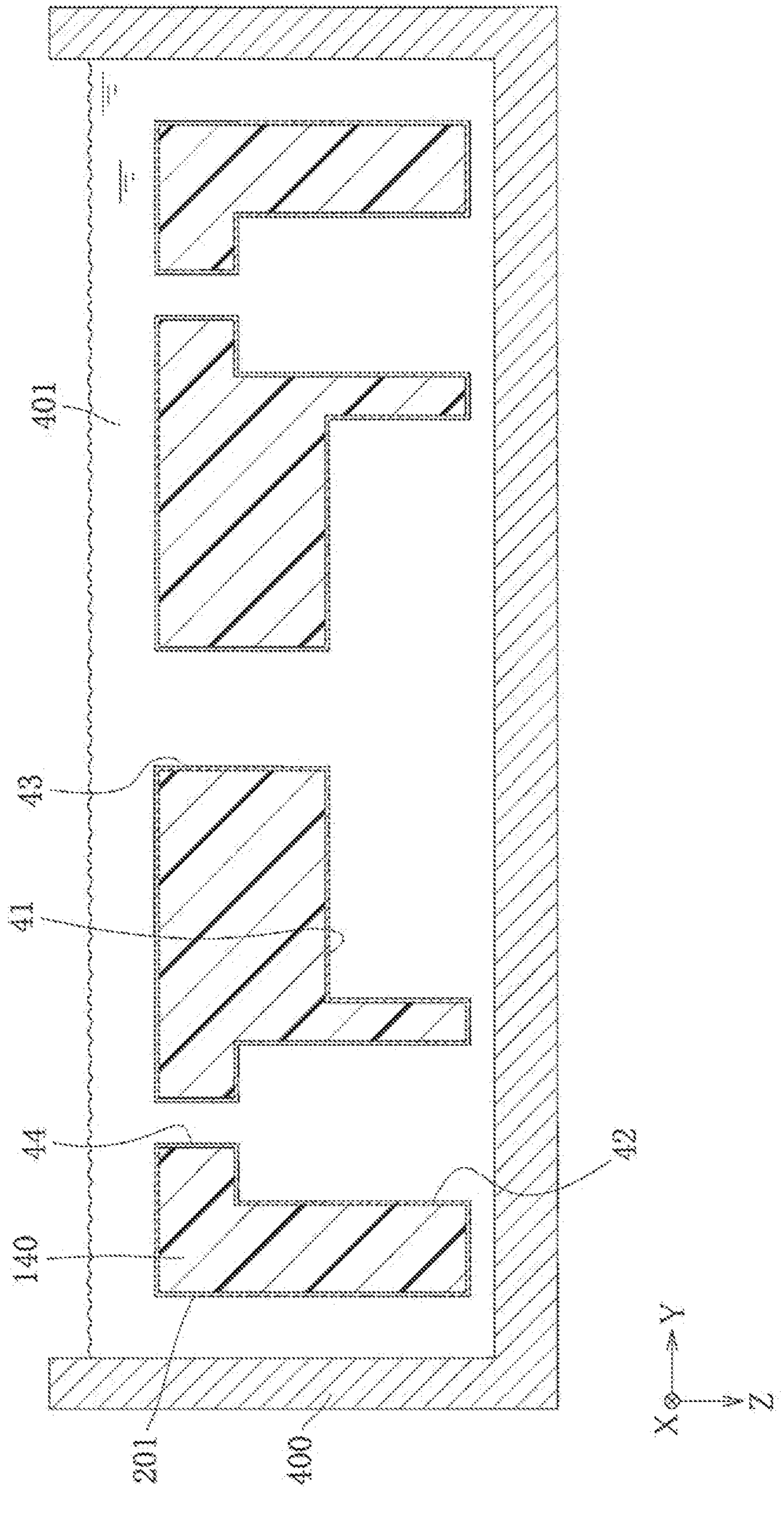
FIG. 6 is a cross-sectional view showing the method of producing the recording head according to Embodiment 1.

Next, as shown in FIG. 6, the first metal protective film 201 is formed at the surface of the case member main body 140. Examples of the metal material used for the first metal protective film 201 include nickel (Ni), copper (Cu), gold (Au), silver (Ag), and platinum (Pt). In the present embodiment, a film made of nickel (Ni) is formed by electroless plating as the first metal protective film 201. Specifically, the first metal protective film 201 formed of nickel (Ni) with a thickness of 0.3 to 0.5 μm is formed by immersing the case member main body 140 in a plating solution containing nickel sulfate. That is, as shown in FIG. 6, the electroless plating of the case member main body 140 is performed by immersing the case member main body 140 in a plating solution 401 held by a plating tank 400. It is preferable that the electroless plating be carried out such that the case member main body 140 and the plating solution 401 are relatively swung. Here, the concept of “the case member main body 140 and the plating solution 401 are relatively swung” includes stirring of the plating solution 401 and swinging of the case member main body 140. For example, it is preferable to use at least one method selected from a method of generating air bubbles in the plating solution 401, a method of stirring the plating solution 401 with a stirring rod, a method of stirring the plating solution 401 with a stirring screw, and a method of swinging the case member main body 140. When the case member main body 140 and the plating solution 401 are relatively swung as described above, the constantly new plating solution 401 can be allowed to enter the surface of the case member main body 140, particularly the third manifold portion 42 which is a groove, and the like, and thus the first metal protective film 201 with a relatively uniform film thickness and less pinholes can be formed. Further, when the case member main body 140 and the plating solution 401 are relatively swung, dust adhering to the surface of the case member main body 140 can be removed, and thus the first metal protective film 201 with a relatively uniform film thickness and less pinholes can be formed.

Further, in a case where the first metal protective film 201 is formed by electroless plating, the first metal protective film 201 can be easily formed at the inner surfaces of the third manifold portion 42 and the introduction passage 44 even when the aspect ratio of the third manifold portion 42 and the introduction passage 44 which are flow passages provided on the case member main body 140 as described above is 2 or greater.

Figure 7:
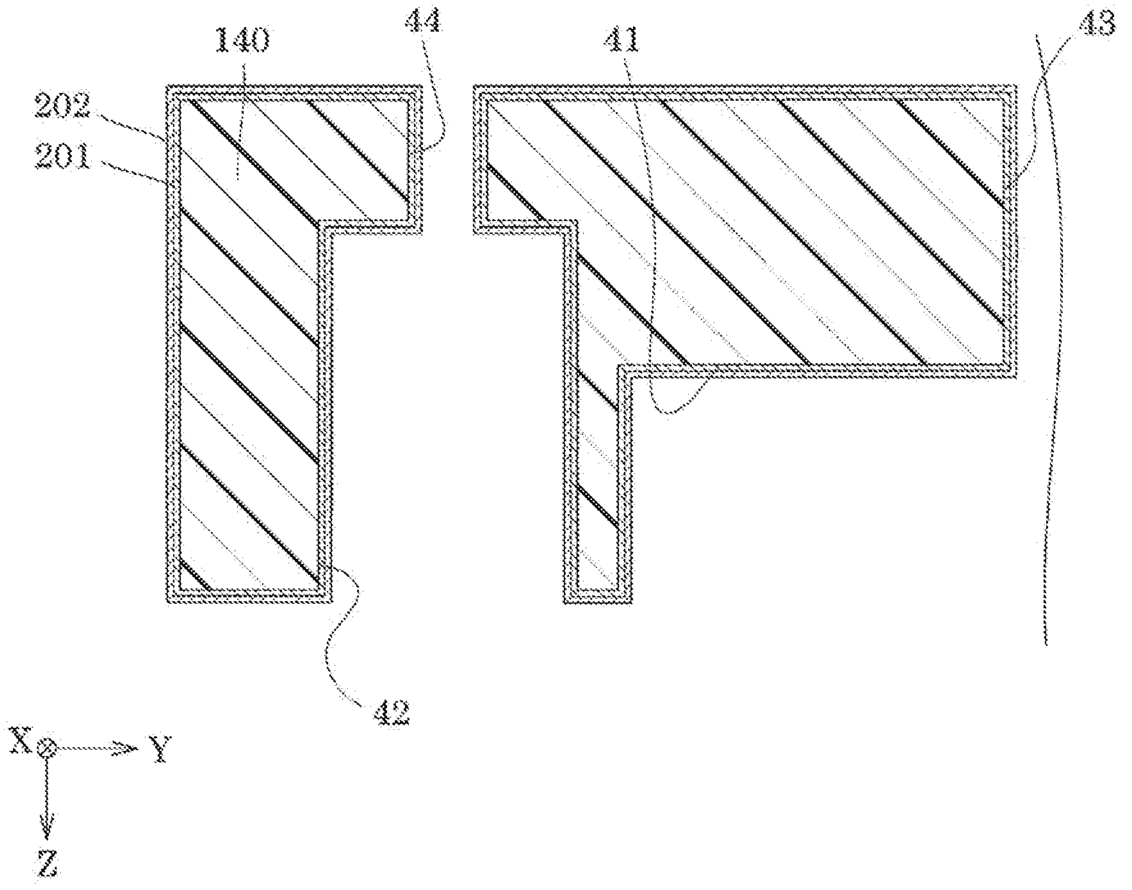
FIG. 7 is a cross-sectional view showing the method of producing the recording head according to Embodiment 1.

Next, as shown in FIG. 7, the second metal protective film 202 is formed at the first metal protective film 201. Examples of the metal material used for the second metal protective film 202 include copper (Cu), nickel (Ni), chromium (Cr), and zinc (Zn). In the present embodiment, a film with a thickness of 5 μm is formed by electroless plating of copper (Cu) as the second metal protective film 202. When the second metal protective film 202 is formed by electroless plating, it is preferable that the case member main body 140 and the plating solution used for electroless plating be relatively swung in the same manner as when the first metal protective film 201 is formed by electroless plating.

Figure 8:
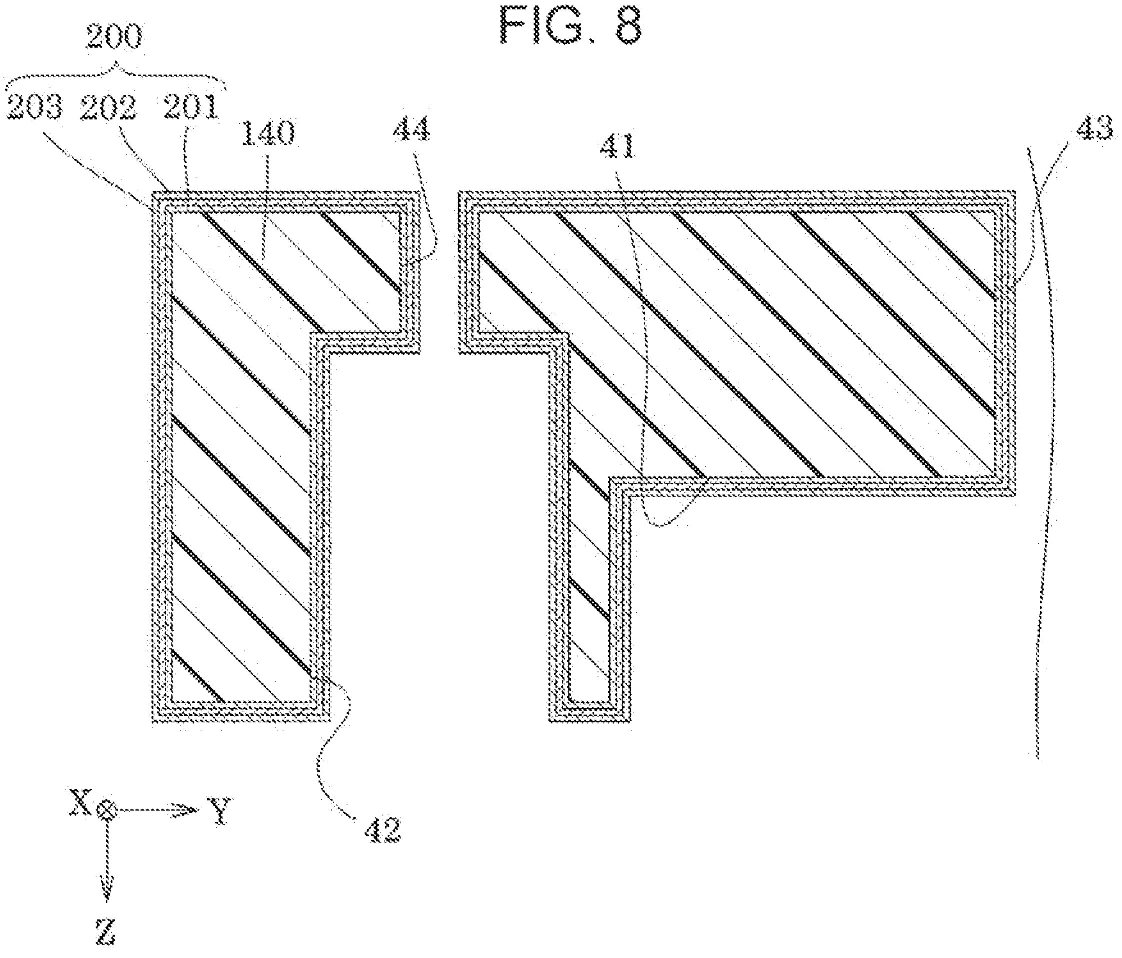
FIG. 8 is a cross-sectional view showing the method of producing the recording head according to Embodiment 1.

Next, as shown in FIG. 8, the third metal protective film 203 is formed at the second metal protective film 202. In this manner, the metal protective film 200 consisting of the first metal protective film 201, the second metal protective film 202, and the third metal protective film 203 is formed at the case member main body 140. A metal material having high liquid resistance is preferable as the metal material used for the third metal protective film 203, and examples thereof include nickel (Ni), chromium (Cr), zinc (Zn), palladium (Pd), a nickel palladium alloy (Ni—Pd alloy), a nickel tin alloy (Ni—Sn alloy), a nickel zinc alloy (Ni—Zn alloy), and gold (Au). In the present embodiment, a film having a thickness of approximately 5 μm is formed by electroplating of nickel (Ni). Since the second metal protective film 202 functions as a stress relieving layer, the internal stress of the entire metal protective film 200 is reduced, and thus the third metal protective film 203 is unlikely to be peeled off from the first metal protective film 201 and the second metal protective film 202. Further, the metal protective film 200 is unlikely to be peeled off from the case member main body 140. Further, since the second metal protective film 202 is soft, the strength of the surface of the metal protective film 200 can be improved by providing the third metal protective film 203, and the metal protective film 200 can be made relatively thick by providing the second metal protective film 202 and the third metal protective film 203.

Further, when the third metal protective film 203 is formed by electroplating, it is preferable that the case member main body 140 and the plating solution be relatively swung in the same manner as when the first metal protective film 201 is formed by electroless plating.

Further, although not particularly shown, the metal protective film 200 may be formed at the sealing film main body 146 of the compliance substrate 45 by the same method as the method for the case member 40 described above. The metal protective film 200 may be formed at a single body of the sealing film main body 146, and the sealing film main body at which the metal protective film 200 is formed may be bonded to the fixed substrate 47. Further, the metal protective film 200 may be formed by bonding the fixed substrate 47 and the sealing film main body 146 to each other so that the fixed substrate 47 and the sealing film main body 146 are integrated with each other. In the present embodiment, the metal protective film 200 may be formed by bonding the fixed substrate 47 and the sealing film 46 to each other.

Figure 9:
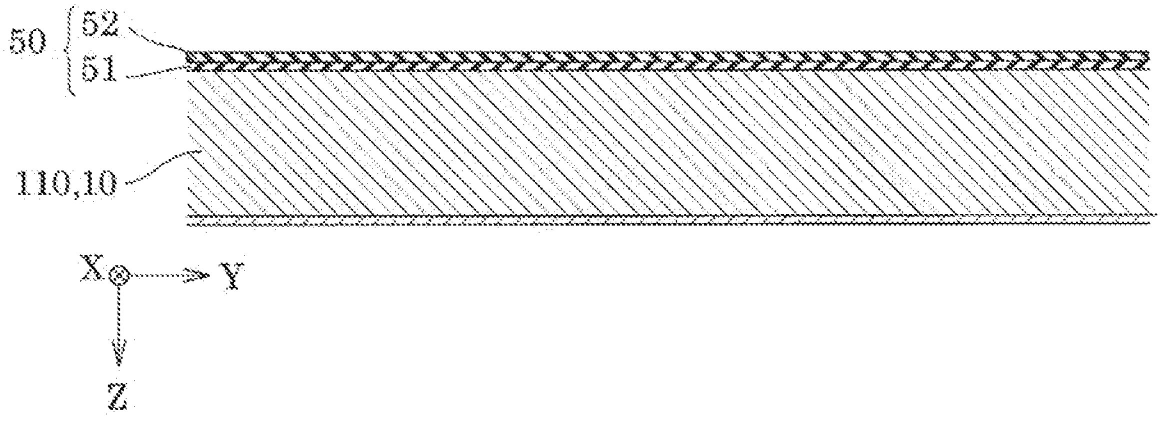
FIG. 9 is a cross-sectional view showing the method of producing the recording head according to Embodiment 1.

As shown in FIG. 9, the vibration plate 50 is formed at one surface of a wafer 110 for a flow passage forming substrate which is a silicon wafer and becomes a plurality of flow passage forming substrates 10. In the present embodiment, the elastic film 51 consisting of silicon dioxide is formed by thermally oxidizing the wafer 110 for a flow passage forming substrate, a zirconium film is formed at the elastic film 51 by a sputtering method, and the zirconium film is thermally oxidized to form the insulator film 52 consisting of zirconium oxide. In this manner, the vibration plate 50 obtained by laminating the elastic film 51 and the insulator film 52 is formed.

The material for forming the vibration plate 50 is not limited to silicon dioxide and zirconium oxide, and silicon nitride ($Si_3N_4$), titanium oxide ($TiO_2$), aluminum oxide ($Al_2O_3$), hafnium oxide ($HfO_2$), magnesium oxide (MgO), lanthanum aluminate ($LaAlO_3$), and the like may be used. Further, the method of forming the elastic film 51 is not limited to thermal oxidation, and the elastic film 51 may be formed by a sputtering method, a physical vapor deposition method (PVD method), a chemical vapor deposition method (CVD method), a spin coating method, or a combination of these methods.

Figure 10:
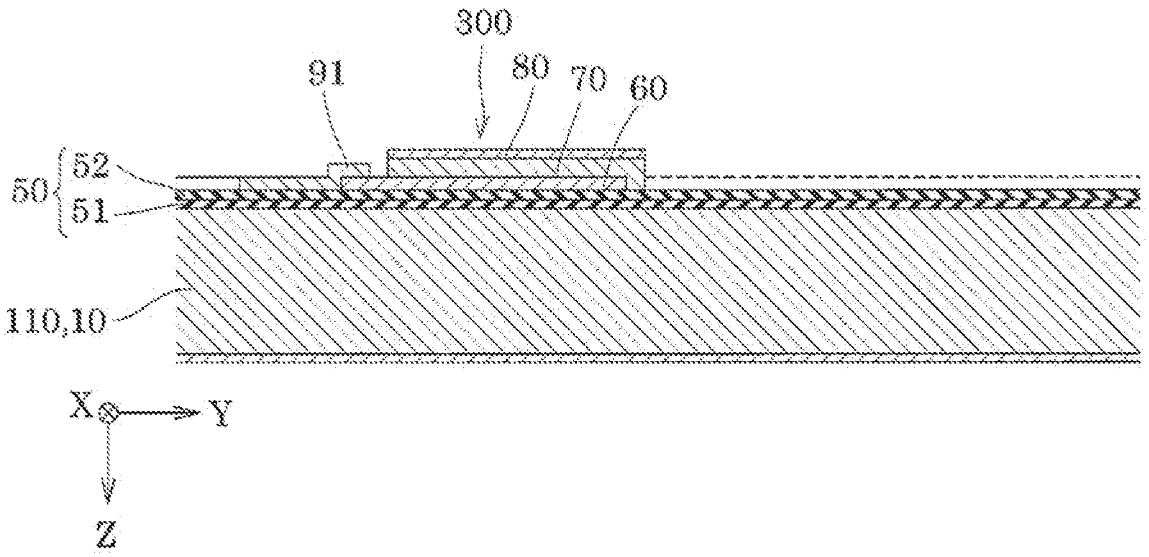
FIG. 10 is a cross-sectional view showing the method of producing the recording head according to Embodiment 1.

Next, as shown in FIG. 10, the piezoelectric actuator 300, the individual lead electrode 91, and the common lead electrode 92 (see FIG. 2) are formed at the vibration plate 50.

Each layer of the piezoelectric actuator 300, the individual lead electrode 91, and the common lead electrode 92 can be formed for each pressure chamber 12 by a film forming method and a lithography method. Further, the piezoelectric layer 70 can be formed, for example, by a PVD method such as a sol-gel method, an MOD method, a sputtering method, or a laser ablation method.

Figure 11:
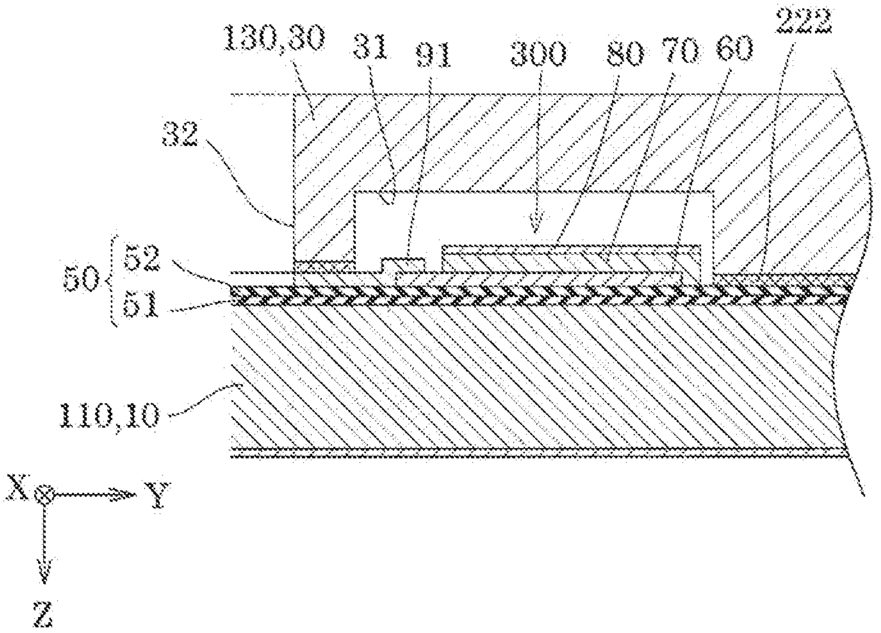
FIG. 11 is a cross-sectional view showing the method of producing the recording head according to Embodiment 1.

Next, as shown in FIG. 11, a wafer 130 for a protective substrate which is a silicon wafer and becomes a plurality of protective substrates 30 is bonded to the wafer 110 for a flow passage forming substrate on the side of the piezoelectric actuator 300 via the adhesive 222. The holding portion 31, the through-hole 32, and the like are formed at the wafer 130 for a protective substrate which is bonded to the wafer 110 for a flow passage forming substrate, and the wafer 130 for a protective substrate and the wafer 110 for a flow passage forming substrate adhere to each other via the adhesive 222. Further, the method of forming the holding portion 31 and the through-hole 32 at the wafer 130 for a protective substrate is not limited, and the holding portion 31 and the through-hole 32 can be formed with high accuracy by anisotropic etching using an alkaline solution such as KOH.

Figure 12:
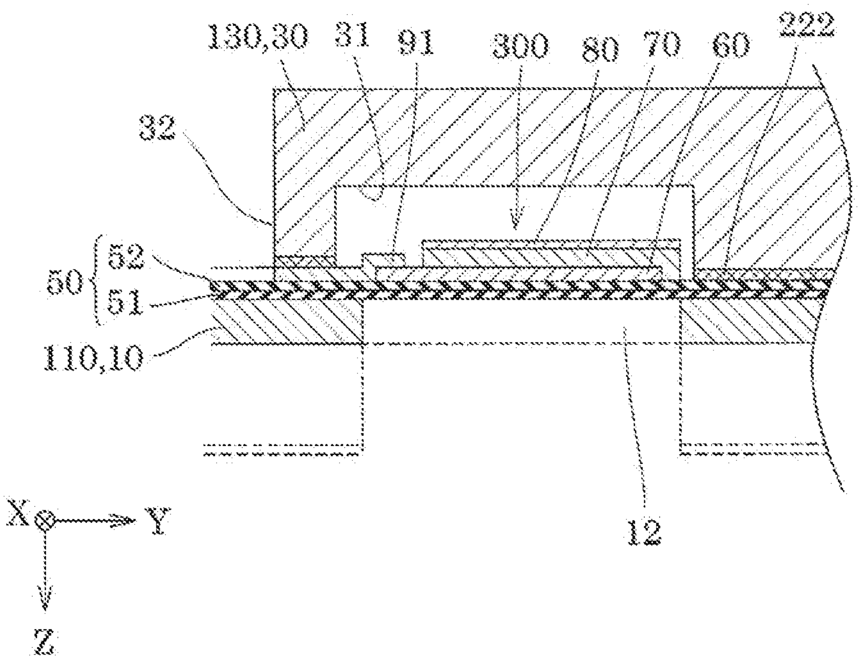
FIG. 12 is a cross-sectional view showing the method of producing the recording head according to Embodiment 1.

Next, as shown in FIG. 12, the pressure chamber 12 corresponding to the piezoelectric actuator 300 is formed by reducing the thickness of the wafer 110 for a flow passage forming substrate to have a predetermined thickness and performing anisotropic etching on the wafer 110 for a flow passage forming substrate via a mask, which is not shown, from a side of the wafer 110 opposite to the surface of the wafer 130 for the protective substrate.

Figure 13:
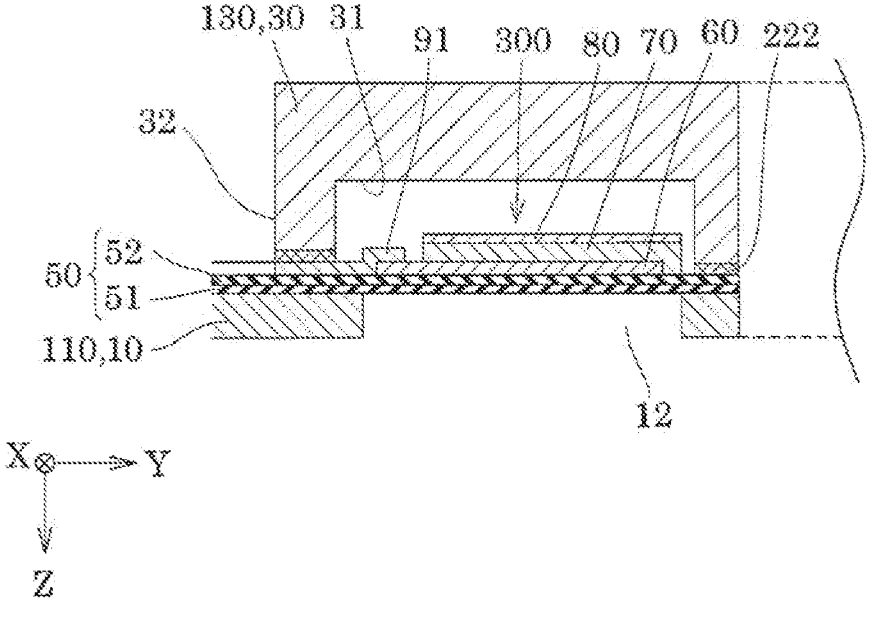
FIG. 13 is a cross-sectional view showing the method of producing the recording head according to Embodiment 1.

Next, as shown in FIG. 13, unnecessary portions of the wafer 110 for a flow passage forming substrate and the wafer 130 for a protective substrate are removed, and the wafer 110 for a flow passage forming substrate and the wafer 130 for a protective substrate are divided into the flow passage forming substrate 10 and the protective substrate 30 with one chip size as shown in FIG. 1.

Figure 14:
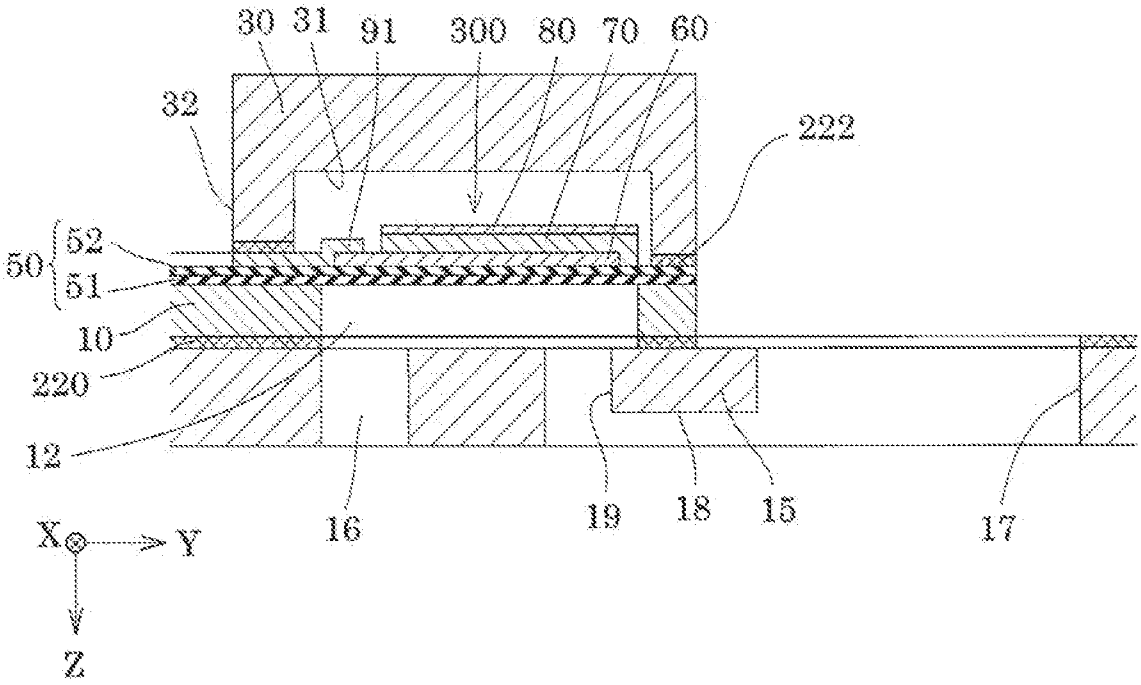
FIG. 14 is a cross-sectional view showing the method of producing the recording head according to Embodiment 1.

Next, as shown in FIG. 14, the communication plate 15 is bonded to the divided flow passage forming substrate 10. The nozzle communication passage 16, the first manifold portion 17, the second manifold portion 18, and the supply communication passage 19 are formed at the communication plate 15 in advance, and the communication plate 15 and the flow passage forming substrate 10 adhere to each other via the adhesive 220.

Figure 15:
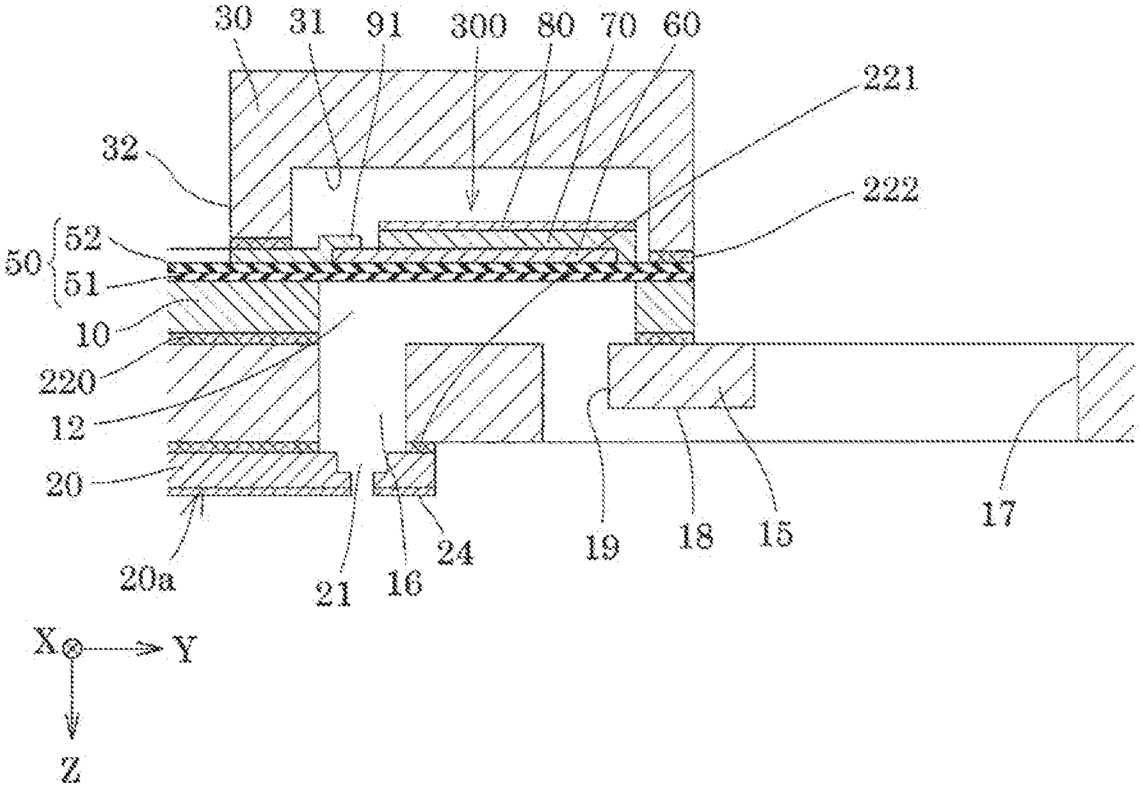
FIG. 15 is a cross-sectional view showing the method of producing the recording head according to Embodiment 1.

Next, as shown in FIG. 15, the nozzle plate 20 adheres to the communication plate 15. The nozzle 21 is formed at the nozzle plate 20 in advance, and the liquid-repellent film 24 is formed at the liquid ejecting surface 20*a*. The nozzle plate 20 and the communication plate 15 adhere to each other via the adhesive 221.

Figure 16:
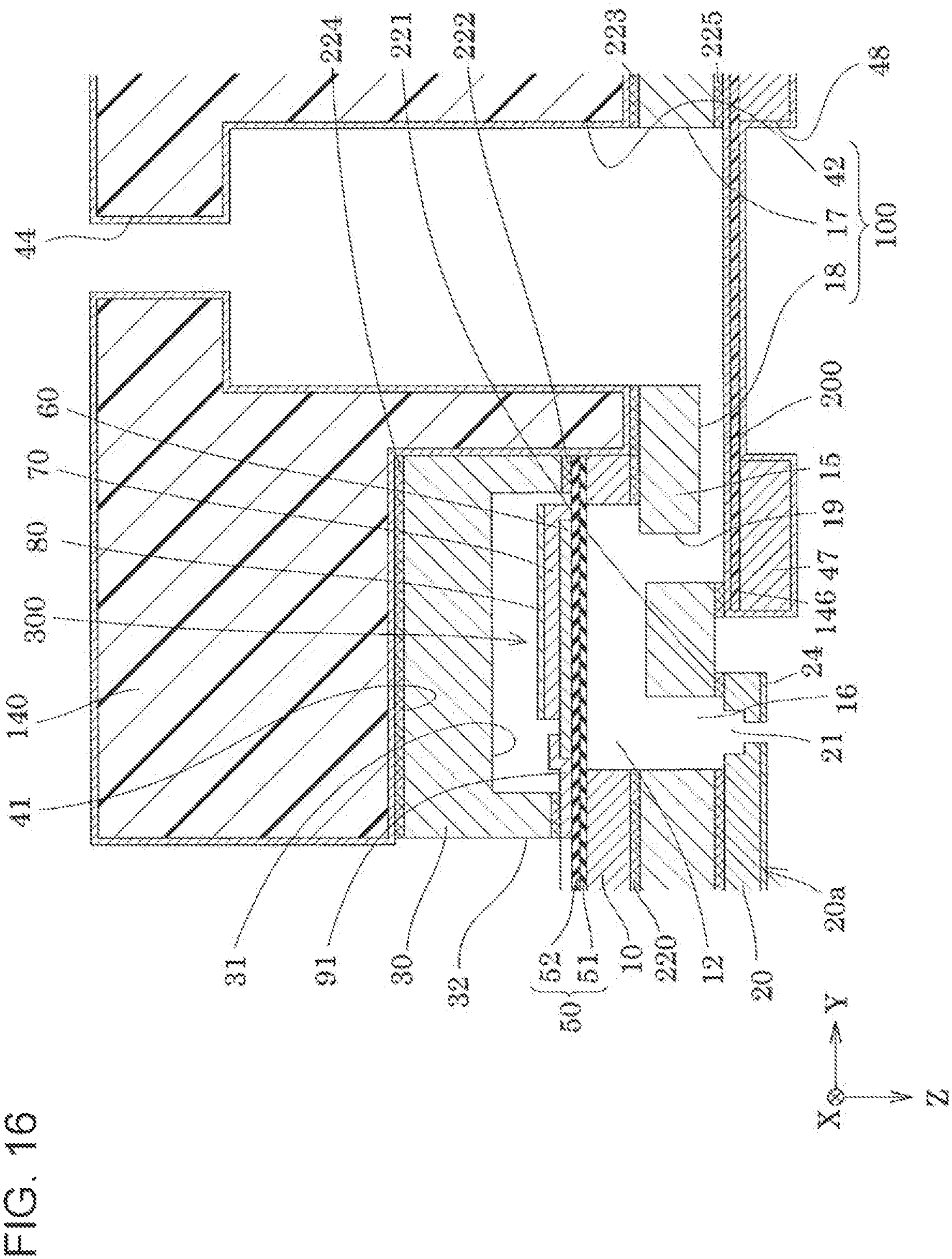
FIG. 16 is a cross-sectional view showing the method of producing the recording head according to Embodiment 1.

Next, as shown in FIG. 16, the case member main body 140 at which the metal protective film 200 is formed is bonded to the communication plate 15 and the protective substrate 30, and the sealing film main body 146 to which the fixed substrate is bonded and at which the metal protective film 200 is formed is bonded to the communication plate 15. The communication plate 15, the protective substrate 30, and the case member main body 140 are bonded to each other via the adhesive 224. In this manner, a bonded material obtained by bonding the flow passage forming substrate 10, the protective substrate 30, the communication plate 15, the nozzle plate 20, the case member main body 140, the sealing film main body 146, and the fixed substrate 47 to each other is formed.

Figure 17:
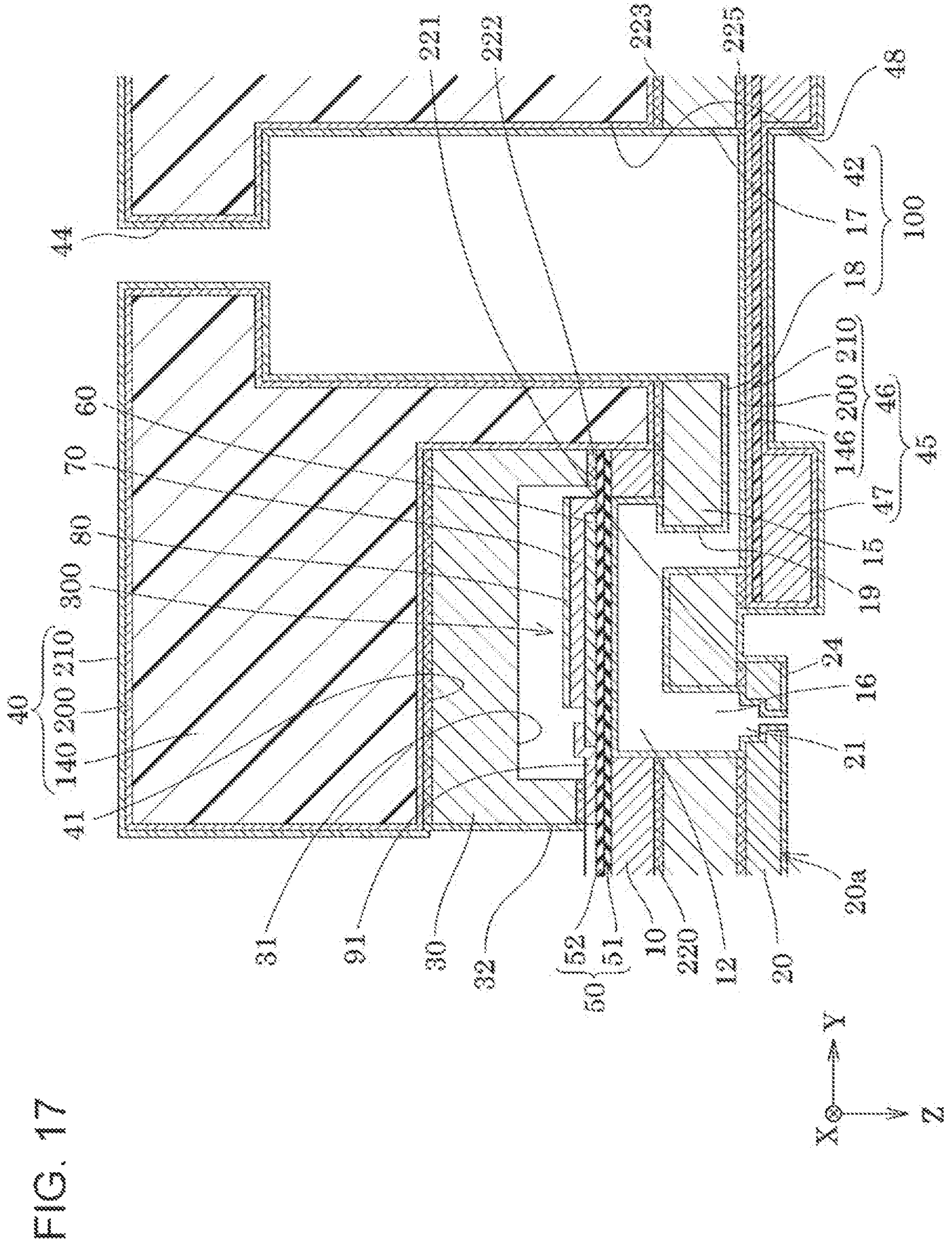
FIG. 17 is a cross-sectional view showing the method of producing the recording head according to Embodiment 1.

Next, as shown in FIG. 17, the protective film 210 is formed at least at the inner surface of the flow passage of the bonded material by the atomic layer deposition (ALD) method. That is, in the present embodiment, the protective film 210 is formed after the case member main body 140 and the sealing film main body 146 without formation of the protective film 210, and the communication plate 15 which is an adherend member adhering thereto and defining the flow passage adhere to each other.

The material used for the protective film 210 contains an oxide or a nitride of at least one element selected from the group consisting of tantalum (Ta), titanium (Ti), zirconium (Zr), niobium (Nb), vanadium (V), hafnium (Hf), silicon (Si), aluminum (Al), tungsten (W), and yttrium (Y). In the present embodiment, hafnium oxide ($HfO_x$) is formed into a film with a thickness of 20 nm or greater and 40 nm or less as the protective film 210.

Further, in the present embodiment, when the protective film 210 is formed at the bonded material by the atomic layer deposition method, the protective film 210 that is continuous over the inner surface of the flow passage of the bonded material, that is, the inner surfaces of the manifold 100, the supply communication passage 19, the pressure chamber 12, the nozzle communication passage 16, and the nozzle 21 can be formed. Further, since the protective film 210 is formed after the case member main body 140, the sealing film main body 146, and the communication plate 15 which is an adherend member adhering thereto and defining the flow passage adhere to each other, the protective film 210 can be formed continuously on the surfaces of the adhesives 224 and 225 on the side of the flow passage. That is, the protective film 210 can be formed over the case member main body 140, the adhesive 224, and the communication plate 15 on the inner surface of the manifold 100 which is the flow passage, and the protective film 210 can be formed over the sealing film main body 146, the adhesive 225, and the communication plate 15. Therefore, entrance of the ink into the adhesive interface between the case member main body 140, the sealing film main body 146, and the communication plate 15 can be suppressed, the adhesives 224 and 225 can also be protected by the protective film 210, erosion of the adhesives 224 and 225 by the ink can be suppressed, and a decrease in adhesive strength can be suppressed.

Further, in the present embodiment, the protective film 210 is also provided on the outer peripheral surface of the bonded material. Here, the protective film 210 is not provided on a region of the nozzle plate 20 where the liquid-repellent film 24 is formed and terminal portions of the individual lead electrode 91 and the common lead electrode 92 to which the wiring substrate 121 is coupled. During the formation of the protective film 210, a region where the protective film 210 is not intended to be formed may be protected by protective tape or the like. Further, when the protective film 210 is provided on the outer peripheral surface of the bonded material, erosion or swelling of the outer peripheral surface due to the ink can be suppressed even in a case where the ink adheres to the outer peripheral surface of the bonded material.

In the present embodiment, the protective film 210 is provided on substantially the entire surface of the bonded material, but the configuration is not limited thereto, and the protective film 210 may be provided only on the inner surface of the flow passage of the bonded material. For example, when the protective film 210 is formed only at the inner surface of the flow passage, the outer peripheral surface may be protected by protective tape and gas used in the ALD process may be introduced from the introduction passage 44.

The case member main body 140 and the sealing film main body 146 formed of the resin material can be reliably protected from the ink by forming the metal protective film 200 formed of the metal material at the case member main body 140 and the sealing film main body 146 formed of the resin material and forming the protective film 210 at the metal protective film 200 by the atomic layer deposition method. That is, in the film formation according to the atomic layer deposition method, a film can be formed with a high film density in a dense state, the film thickness can be made uniform, and deposition on an object is greatly enhanced even when the shape of the object is significantly uneven. Therefore, the protective film 210 can be uniformly formed over the inside of minute defects such as pinholes or pits formed in the metal protective film 200, by forming the protective film 210 at the metal protective film 200 formed at the case member main body 140 and the sealing film main body 146 using an atomic layer deposition method. Therefore, when the protective film 210 is provided, it is possible to suppress the surface of the resin material from being exposed and to allow the protective film 210 to protect the case member 40 formed of the resin material from the ink. Here, the protective film 210 can be formed with a high film density in a dense state even in the inner surfaces of the flow passages of the flow passage forming substrate 10, the communication plate 15, and the nozzle plate 20 which are formed of a material other than the resin material and in the present embodiment, formed of a silicon substrate. Accordingly, a member formed of a material other than the resin material can be protected by the protective film 210.

In addition, for example, when the protective film 210 is intended to be formed directly on the case member main body 140 and the sealing film main body 146 formed of the resin material using the atomic layer deposition method, pinholes and the like are generated by the gas generated from the resin material due to heating particularly during the film formation, and thus there is a concern that the protective film 210 cannot be satisfactorily formed over the entire surface of the case member main body 140 and the sealing film main body 146. Further, since the film forming speed is low in a case of using the atomic layer deposition method, a film is formed with a relatively small film thickness as compared with the metal protective layer 200 to be formed by plating. Further, one of the reasons is that the protective film 210 is not formed of a metal but contains an oxide or a nitride and the ductility is unlikely to increase, and there is a concern that the protective film 210 falls off together with the filler contained in the resin material of the case member main body 140 and pinholes and the like are generated even when the protective film 210 with a relatively small film thickness is directly formed on the case member main body 140. Further, when the protective film 210 is formed to be relatively thick by the atomic layer deposition method, the film formation takes time and this results in an increase in the cost. In the present embodiment, the protective film 210 is formed at the metal protective film 200 by the atomic layer deposition method, and thus it is possible to suppress gas release from the case member main body 140 and the sealing film main body 146 formed of the resin material during the formation of the protective film 210 and to suppress generation of pinholes and the like in the protective film 210 due to the gas release. Further, when the metal protective film 200 is formed to be thicker than the protective film 210, the filler contained in the resin material is difficult to fall off. Therefore, the case member main body 140 and the sealing film main body 146 can be reliably protected by the protective film 210 and the cost can be reduced.

Thereafter, the recording head 1 of the present embodiment illustrated in FIG. 2 can be formed by electrically and mechanically coupling the wire substrate 121 to the individual lead electrode 91 and the common lead electrode 92.

Test Examples

A test piece formed of polycarbonate was used as a sample 1.

The first metal protective film 201 consisting of nickel (Ni) with a thickness of 0.3 μm by electroless plating, the second metal protective film 202 consisting of copper (Cu) with a thickness of 5 μm by electroplating, and the third metal protective film 203 consisting of nickel (Ni) with a thickness of 5 μm by electroplating were laminated on the surface of the test piece formed of polycarbonate to form the metal protective film 200 and the resultant was used as a sample 2.

The protective film 210 consisting of hafnium oxide (HfOX) with a thickness of 30 nm was formed by the atomic layer deposition method on the surface of the test piece formed of polycarbonate and the resultant was used as a sample 3.

The same metal protective film 200 as in the sample 2 was formed at the surface of the test piece formed of polycarbonate, the same protective film 210 as in the sample 3 was formed at the metal protective film 200, and the resultant was used as a sample 4.

These samples 1 to 4 were immersed in cyclohexanone at a temperature of 60° C. for one week, and the rate of change in weight (also referred to as an expansion rate) before and after the immersion was measured. The results are listed in Table 2. Further, cyclohexanone is a main solvent used for solvent ink for the purpose of dissolving a resin film which is a recording medium to improve the adhesiveness and has high resin solubility.

TABLE 2

| | Sample 1 (resin material) | Sample 2 (resin material + metal protective film) | Sample 3 (resin material + protected film) | Sample 4 (resin material + metal protective film + protective film) |
|---|---|---|---|---|
| Rate of change in weight | −10.1% | +0.9% | +2.1% | +0.03% |

As listed in Table 2, in the test, piece of the sample 1 which was not provided with the metal protective film 200 and the protective film 210, the weight was reduced by 10.1%. In other words, the expansion rata was −10.1%. Further, in the test piece of the sample 2 which was provided with only the metal protective film 200, the weight was increased by 0.9% (in other words, the expansion rate was +09) In the test piece of the sample 3 which was provided with only the protective film 210, the weight was increased by 2.1% (in other words, the expansion rate was +2.1%). In the test piece of the sample 4 which was provided with the metal protective film. 200 and the protective film. 210, the weight was increased by 0.03% fin other words, the expansion rate was +0.03%). As shown in the results, it was considered that the weight in the sample 1 was decreased due to the dissolution of the resin material in the solvent. Further, when the metal protective film. 200 or the protective film 210 was directly formed on the resin material as in the samples 2 and 3 it was considered that the rate of change in weight was increased due to formation of pinholes in the metal protective film 200 and the protective film. 210 and infiltration of the solvent into the resin material from the pinholes. On the contrary, the infiltration of the solvent into the resin material was minimized by laminating the metal protective film 200 and the protective film. 210 on the resin material as in the sample 4.

As described above, the case member 40 and the sealing film 46 serving as the flow passage forming members of the present embodiment include the case member main body 140 and the sealing film main body 146 which are formed of the resin material and serve as a flow passage forming member main body defining at least a part of the manifold 100 which is a flow passage. Further, the case: member 40 and the sealing film 4S include the metal protective film 200 provided on the surfaces of the case member main body 140 and the sealing film main body 146, which define at least the manifold 100, and formed of the metal material. Further, the case: member 40 and the sealing film 46 includes the protective film 210 laminated on the metal protective film 200 and containing an oxide or a nitride of at least one element selected from the group consisting of tantalum (Ta) titanium (Ti), zirconium (Er), niobium (Nb), vanadium (V), hafnium. (Hf), silicon (Si), aluminum (Al), tungsten (W), and yttrium CO.

A described above, the liquid resistance of the ca merrier main body 140 and the sealing film main body 146 formed of the resin material can be improved by providing the protective film. 210 containing an oxide or a nitride of the above-described material. Further, the thermal conductivity can be improved and uneven temperature distribution of the liquid in the flow passage can be reduced by providing the metal protective film 200 on the case member main body 140 and the sealing film main body 146.

Further, in the case member 40 and the sealing film 46 which are the flow passage forming members of the present embodiment, it is preferable that the protective film 210 contain silicon (Si). When the protective film 210 contains silicon (Si), it is possible to improve the hydrophilicity of the protective film 210 with respect to water, that is, the wettability, suppress air bubbles contained in the ink flowing in the flow passage from remaining in the flow passage, and improve the air bubble discharge property.

Further, in the case member 40 and the sealing film 46 which are the flow passage forming members of the present embodiment, it is preferable that the thickness of the metal protective film 200 be greater than the thickness of the protective film 210. When the metal protective film 200 is formed to be relatively thick, it is possible to suppress the metal protective film 200 and the protective film 210 from falling off together with the filler contained in the resin material. Further, when the metal protective film 200 is formed to be relatively thick, the thermal conductivity can be improved.

Further, in the case member 40 which is the flow passage forming member of the present embodiment, it is preferable that the resin material contain particles other than the resin. When the case member 40 contains particles, characteristics of the resin material such as the strength and the linear expansion coefficient can be improved. Further, it is possible to suppress the metal protective film 200 and the protective film 210 from falling off together with the filler contained in the resin material.

Further, in the case member 40 and the sealing film 46 which are the flow passage forming members of the present embodiment, it is preferable that the metal protective film 200 have a thickness of 1 μm or greater. When the metal protective film 200 has a thickness of 1 μm or greater, it is possible to suppress the metal protective film 200 from falling off together with the filler contained in the resin material. Further, the thermal conductivity of the resin material can be Improved.

Further, in the case member 40 and the sealing film 46 which are the flow passage forming members of the present embodiment, it, is preferable that the protective film 210 contain hafnium (Hf). When the protective film 210 contains hafnium (Hf) having both strong basicity and strong acidity, it is possible to suppress the protective film 210 from being eroded by the ink and more reliably suppress the case member main body 140 and the sealing film main body 14 from being eroded or from being swollen by the ink.

Further, in the case member 40 and the sealing film 46 which are the flow passage forming members of the present embodiment, it, is preferable that the metal protective film 200 contain copper (Cu). The metal protective film 200 has a relatively small internal stress, and the internal stress of the metal protective film. 200 can be relived when the metal protective film 200 contains soft copper (Cu).

Further, in the case member 40 and the sealing film 46 which are the flow passage forming members of the present embodiment, it is preferable: that the metal protective film 200 contain at least one of nickel phosphorus (Ni—P) or nickel boron (Ni—B), The liquid resistance of the case members main body 140 and the sealing film main body 146 can be improved when the protective film 210 contains nickel phosphorus (Ni—P) and nickel boron (Ni—B) with high liquid resistance.

Further, in the case maker 40 and the sealing film 46 which are the flow passage forming members of the present embodiment, it is preferable that the metal protective film 200 include the third metal protective film 203 which is an upper layer provided on the side of the protective film 210 and the second metal protective film 202 which is a lower layer provided on the side of the case member main body 140 and the sealing film main body 146 serving as the flow passage forming member main bodies with respect, to the third metal protective film 203 and that the third metal protective film 203 have a Mohs hardness greater than the Mohs hardness of the second metal protective film 202. In this manner, when the third metal protective film 203 is formed of a material having a Mohs hardness greater than that of the second metal protective film 202, the surface of the metal protective film 200 is unlikely to be damaged, and the resin material can be protected by the metal protective film 200.

Further, in the case member 40 and the sealing film 46 which are the flow passage forming members of the present embodiment, it is preferable that the second metal protective film 202 which is the lower layer contain copper Cu) and the third metal protective film 203 which is the upper layer contain at least one of nickel (Ni) or chromium (Cr). In this manner, when the second metal protective film 202 contains copper (Cu), the thermal conductivity of the metal protective film 200 can be improved. Further, when the third metal protective film 203 is formed of at least one of nickel (Ni) or chromium (Cr), significant degradation of the thermal conductivity of the metal protective film 200 can be suppressed, and the third metal protective film 203 can be easily formed by electroplating.

Further, in the case member 40 and the sealing film 46 which are the flow passage forming members of the present embodiment, it is preferable that the third manifold portion 42 and the introduction passage 44 which are flow passages be formed at a groove provided in the case member main body 140 which is the flow passage forming member main body, the groove have an aspect ratio of 2 or greater which is obtained by dividing the depth by the inlet diameter, and the metal protective film 200 on the side closest to the case member main body 140 contain at, least one of nickel phosphorus (Ni—F) or nickel boron (Ni—B). Even when the groove that is the flow passage formed at the case member main body 140 is a relatively deep groove with an aspect ratio of 2 or greater, nickel phosphorus (Ni—P) and nickel boron (Ni—B) can be easily formed into a film by alectroless plating.

Further, the ink jet, recording head 1 which is an example of the liquid ejecting head of the present embodiment includes the case member 40 and the sealing film 46 which are the flow passage forming members described above. In this manner, the liquid resistance and the thermal conductivity of the case: member 40 and the sealing film 4 formed of the resin material can be improved, and various inks can be ejected regardless of the liquid resistance of the resin material itself.

Further, the recording head 1 of the present embodiment includes a plurality of the nozzles 21 electing a liquid, the supply communication passage 19 which is an individual flow passage provided for each nozzle 21, the pressure chamber 12, and the nozzle communication passage 16, and it is preferable that the flow passages of the case member 40 and the sealing film 46 be at least a part of the manifold 100 which is a common liquid chamber communicating the plurality of the individual flow passages in common. In this manner, the thermal conductivity of the case member 40 and the sealing film 46 can be: improved by the metal protective film 200, and uneven temperature distribution of the ink in the manifold 100 can be reduced. Therefore, variation in the temperature of the ink supplied to each individual flow passage from the manifold 100 can be suppressed, and variation in ejecting characteristics of the ink elected from each nozzle 21 can be suppressed.

Further, a method of producing the case member 40 and the sealing film 46 which are examples of the flow passage forming members of the present embodiment is performed by forming the metal protective film 200 formed of the metal material at the surface defining the manifold 100 which is at least the flow passage of the case member main body 140 and the sealing film main body 146 which are formed of the resin material and serve as a flow passage forming member main body defining at least a part of the flow passage and forming the protective film 210 at the metal protective film 200 by the atomic layer deposition method and containing an oxide or a nitride of at least one element selected from the group consisting of tantalum (Ta), titanium (Ti), zirconium (Zr), niobium (Nb), vanadium CV), hafnium (Hf), silicon (Si), aluminum (Al), tungsten (W), and yttrium (Y). In this manner, when the metal protective film 200 is formed at the case member main body 140 and the sealing film main body 146 formed of the resin material and the protective film 210 is formed by the atomic layer deposition method, even in a case where pinholes are formed in the metal protective film 200, the protective film 210 can also be formed inside of pinholes. Therefore, the liquid resistance of the case member main body 140 and the sealing film main body 146 can be improved by the protective film 210. Further, since the protective film 210 is formed at the metal protective film 200 which is different from the case of forming the protective film 210 at the surface of the resin material, it is possible to suppress gas release from the resin material and to suppress generation of pinholes and the like in the protective film 210 due to the gas release.

Further, in the method of producing the case member 40 and the sealing film 46 which are the flow passage forming member s of the present embodiment, it is preferable that the metal protective film 200 have the first metal protective film 201, which is the lowermost layer on the side of the case member main body 140 and the sealing film main body 146 which are at least the flow passage forming member main bodies, formed by electroless plating. The first metal protective film 201 can be easily formed in the groove serving as the flow passage of the case member main body 140 and the sealing film main body 146, and the cost can be reduced.

Further, in the method of producing the case member 40 and the sealing film 46 which are the flow passage forming members of the present embodiment, it is preferable that the metal protective film 200 be formed by electroless plating and electroplating. In this manner, a layer with a relatively large film thickness can be formed by electroplating. Therefore, it is possible to suppress the filler contained in the resin material from falling off due to the relatively thick metal protective film 200.

Further, in the method of producing the case member 40 and the sealing film 46 which are the flow passage forming members of the present embodiment, it is preferable that the case member main body 140 and the sealing film main body 146 which are the flow passage forming member main bodies and the plating solution 401 be relatively swung when the metal protective film 200 is formed by plating. When the case member main body 140, the sealing film main body 146, and the plating solution 401 are relatively swung as described above, the constantly new plating solution 401 can be allowed to enter the surfaces of the case member main body 140 and the sealing film main body 146, particularly the third manifold portion 42 which is a groove provided on the case member main body 140, and the like. Therefore, the first metal protective film. 201 with a relatively uniform film thickness and less pinholes can be formed. Further, when the case member main body 140, the sealing film main body 146, and the plating solution 401 are relatively swung, dust adhering to the surfaces of the case member main body 140 and the sealing film main body 145 can be removed, and thus the first metal protective film 201 with a relatively uniform film thickness and less pinholes can be formed.

Further, the method of producing the ink jet recording head 1 which is an example of the liquid ejecting head of the present embodiment includes the method of producing the flow passage forming member described above. The recording head 1 with high liquid resistance can be easily formed.

Further, in the method of producing the recording head 1 of the present embodiment, it is preferable that the recording head 1 include the case member 40 and the sealing film 46 which are the flow passage forming members, and the communication plate 18 which is an adherend member adhering to the case: member 40 and the sealing film 46 and defining the manifold 100 that is a flow passage and that, the protective film 210 be formed after the case member main body and the sealing film main body 146 which are the flow passage forming member main bodies and the communication plate 15 adhere to each other. Since the liquid resistance of the adhesives 224 and 225 used to adhere the case member main body 140, the sealing film main body 145, and the communication plate 15 can be improved, a material with low liquid resistance can be used for the adhesives 224 and 225.

Embodiment 2

Figure 18:
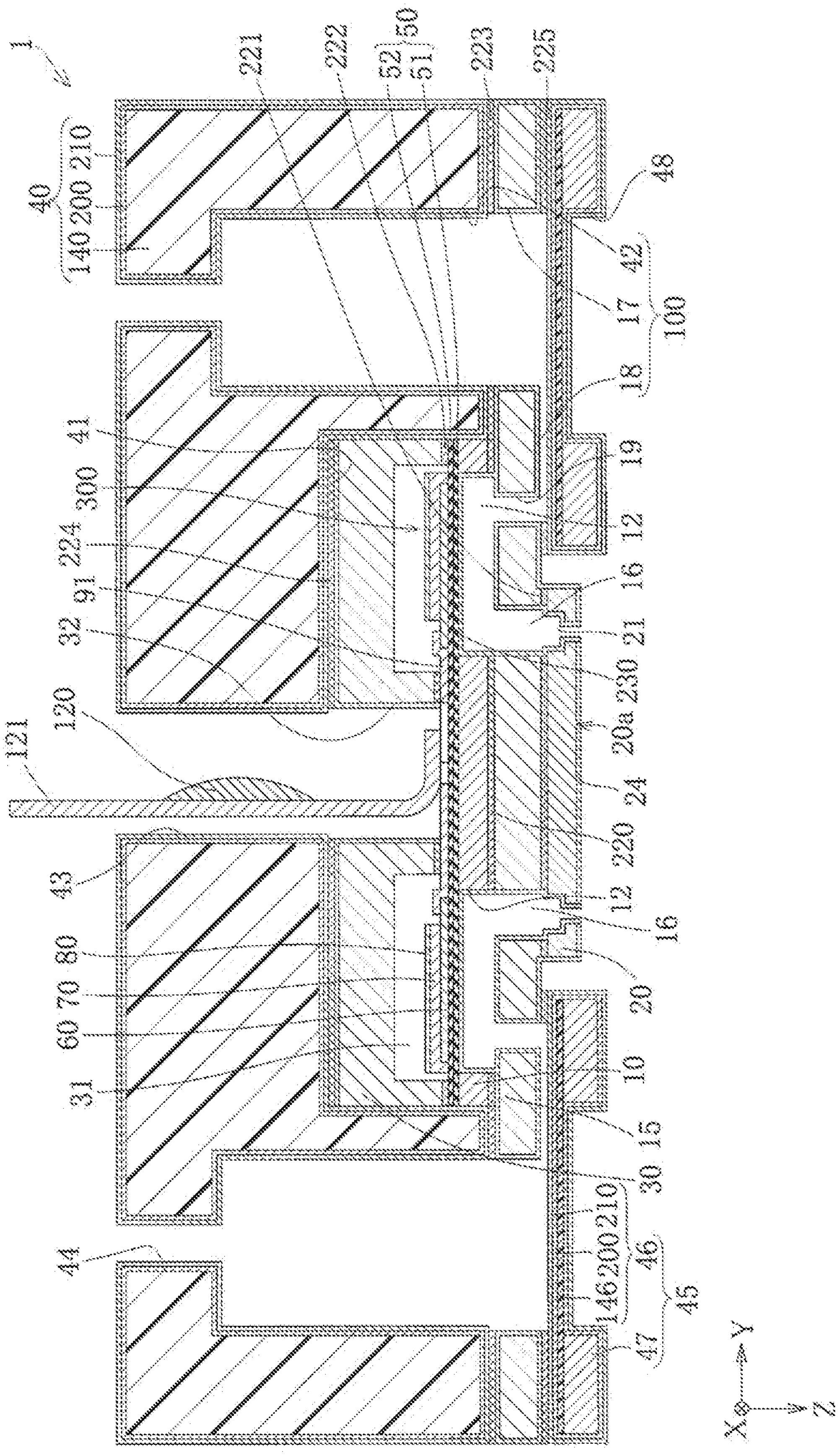
FIG. 18 is a cross-sectional view showing a recording head according to Embodiment 2.

FIG. 18 is a cross-sectional view showing the ink jet recording head 1 which is an example of the liquid ejecting head according to Embodiment 2. Further, the same members as those of the embodiment described above are denoted by the same reference numerals and the description thereof will be omitted as appropriate.

As shown in FIG. 1S, the case member 40 which is the flow passage forming member constituting the recording head 1 of the present embodiment includes the case metier main body 140 formed of the resin material, the metal protective film. 200, and the protective film 210 The metal protective film 200 and the protective film 210 are provided continuously over the entire surface: of the case member main body 140.

The metal protective film 200 and the protective film 210 described above are the same as those in Embodiment 1 described above, and thus the description thereof will not be repeated.

Further, the metal protective film 200 and the protective film 210 are formed by forming the case member main body 140 in a state of a single body.

Further, the sealing film 4 includes the sealing film main body 146 formed of the resin material, the metal protective film 200, and the protective film 210. The metal protective film 200 and the protective film 210 are provided continuously over the entire surface of the bonded material of the sealing film main body 146 and the fixed substrate 47. The metal protective film 200 and the protective film 210 described above are the same as those in Embodiment 1 described above, and thus the description thereof will not be repeated.

Further, the metal protective film 200 and the protective film 210 are formed by forming the bonded material of the sealing film main body 146 and the fixed substrate 47 in a state of a single body. Here, the sealing film 46 and the fixed substrate 47 may be bonded to each other after the sealing film 46 is formed by forming the metal protective film 200 and the protective film 210 in a state where the sealing film main body 146 is a single body.

Further, a flow passage protective film 230 having liquid resistance is formed at the inner surfaces of the flow passages of the flow passage forming substrate 10, the communication plate 15, and the nozzle plate 20 constituting the recording head 1, that is, the inner surfaces of the first manifold portion 17, the second manifold portion 18, the supply communication passage 19, the pressure chamber 12, the nozzle communication passage 16, and the nozzle 21. The material of the flow passage protective film 230 contains the same material as the material of the protective film 210 for example, an oxide or a nitride of one element selected from the group consisting of tantalum (Ta), titanium (Ti), zirconium (Zr), niobium (Nb), vanadium CV), hafnium (Hf), silicon (Si), aluminum (Al), tungsten (W), and yttrium (Y). The flow passage protective film 230 may be formed into a single layer formed of a single material or a composite material or a laminated film obtained by laminating a plurality of materials. Further, it is preferable that the flow passage protective film 230 be formed by the atomic layer deposition method (ALD method). Since the flow passage forming substrate 10, the communication plate 15, and the nozzle plate 20 are formed of a silicon substrate, a dense film can be formed even when the flow passage protective film 230 is directly formed by the atomic layer deposition methods. The method of forming the flow passage protective film 230 is not limited to the atomic layer deposition method, and a sputtering method, a physical vapor deposition method (PVD method) a chemical vapor deposition method (CVD method), a plating method, or the like may be employed, but the atomic layer deposition method which is a film forming method in which a film can be formed to be thin and pinholes are unlikely to be generated is most preferable Here, the flow passage protective film 230 may be provided in a state where each member of the flow passage forming substrata 10, the protective substrate 30, the communication plate 15, the nozzle plate 20, or the like is a single body, but when the flow passage protective film 230 is provided in a state where these members are bonded to each other, the surfaces of the adhesives 220 to on the side of the flow passage can be protected by the flow passage protective film 230 and the liquid resistance can be improved.

Such a flow passage protective film 230 is formed in the state shown in FIG. 15 of Embodiment 1 described above. In the same manner a in Embodiment 1 described above, the film formation may be made in a state where the flow passage forming substrate 10, the protective substrate 30, the communication plate 15, the nozzle plate 20, the case member 40, and the compliance substrate 45 adhere to each other, In this case, the metal protective film 200, the protective film 210, and the flow passage protective film 230 are laminated in this order on the case member main body 140 and the sealing film main body 146. In other words, the protective film 210 and the flow passage protective film 230 correspond to "protective film" described in the claims.

In the present embodiment, since the surfaces of the adhesives 224 and 225 on the side of the flow passage are not covered with the protective film 210 and the flow passage protective film 230, the adhesives 224 and 225 are required to use a material with high liquid resistance, Hers, since the protective film 210 is formed at the adhesive interface of the case member 40, the sealing film 45 and the communication plate 15, it is possible to suppress the case member 40 and the sealing film 45 from being eroded due to the ink entering the adhesive interface.

Other Embodiments

Hereinbefore, each embodiment of the present disclosure has been described, but, the basic configurations of the present disclosure are not limited to the configurations described above.

For example, in each embodiment described above, three layers of the first metal protective film 201, the second metal protective film 202, and the third metal protective film 203 may be provided as the metal protective film 200, but the number of layers is not particularly limited, and the metal protective film 200 may be formed of one or two layers and the metal protective layer 200 may be obtained by laminating four or more layers.

Further, in each embodiment described above, the case member 40 and the sealing film 46 are exemplified a the flow passage forming member of the recording head 1 without, particular limitation, and the flow passage forming member may be: configured to have the flow passage forming member main body formed of the resin material, the metal protective film 200, and the protective film 210 and the same applies to the flow passage forming member having a flow passage coupled to the introduction passage 44 of the case member 40.

Further, in each embodiment described above, the thin film type piezoelectric actuator 300 has been described as the pressure: generation unit that, causes a change in pressure in the pressure chamber 12, but the configuration is not particularly limited thereto. Further, a thick film type piezoelectric actuator formed by the method of bonding a green sheet, a longitudinally vibration type piezoelectric actuator which is obtained by alternately laminating the piezoelectric material and the electrode forming material and stretches and expands in the axial direction, or the like can be used. Further, a pressure generation unit obtained by disposing a heater element in the pressure generation chamber and jetting liquid droplets from the nozzle 21 by bubbles generated by heat generation of the heater element or a so-called electrostatic actuator that generates static electricity between the vibration plate and the electrode, deforms the vibration plata using the electrostatic force, and jetting liquid droplets from the nozzle can be used as the pressure generation unit.

Figure 19:
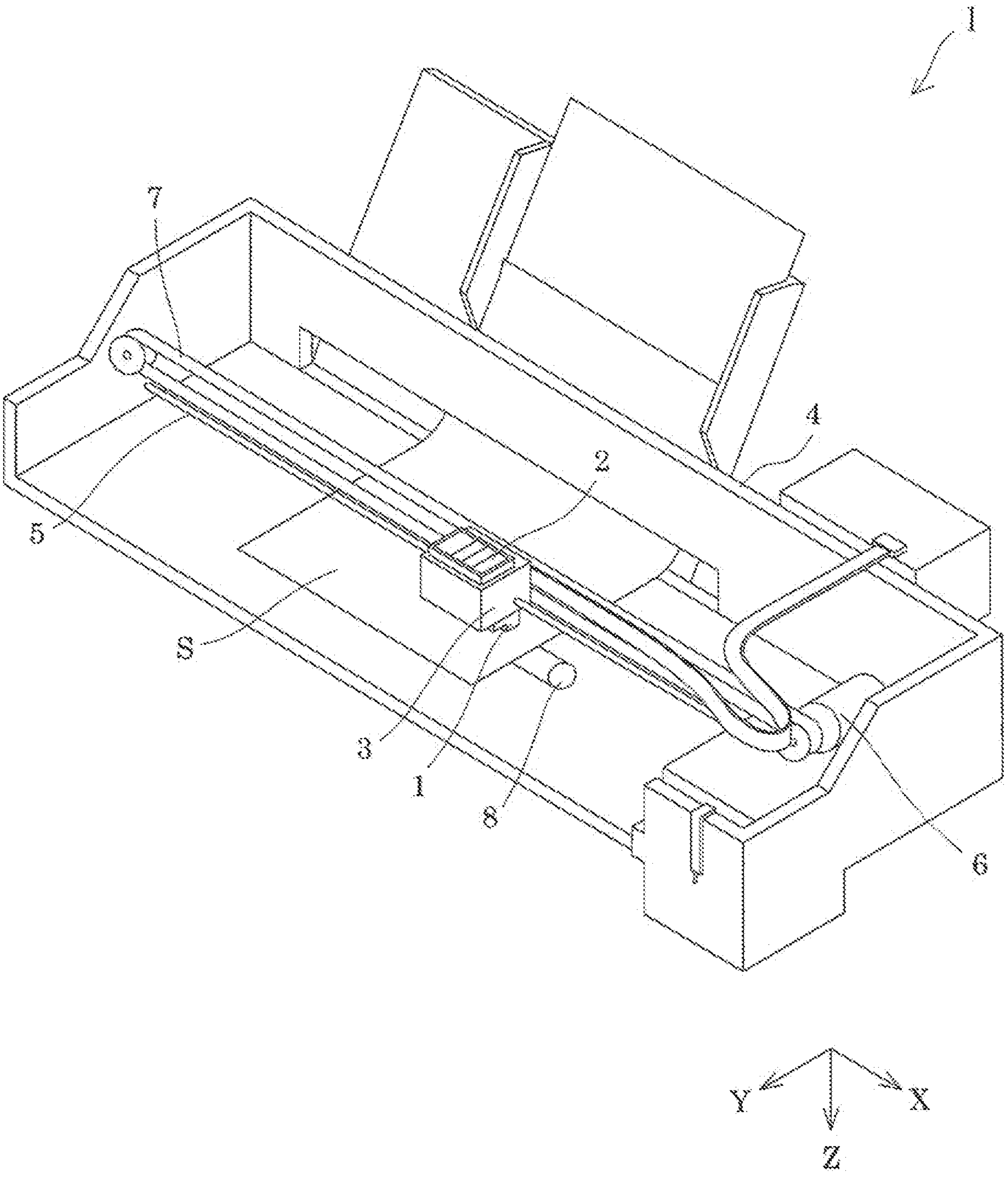
FIG. 19 is a view showing a schematic configuration of a recording device according to an embodiment.

Further, the ink jet recording head 1 of each embodiment is mounted on an ink jet recording device 1 which is an example of a liquid electing apparatus. FIG. 19 is a schematic view showing an example of the ink jet recording device I.

In the ink jet recording device 1 shown in FIG. 19, a cartridge 2 constituting an ink supply unit is provided detachably attached and is mounted on a carriage 3. The carriage 3 on which that recording head 1 is mounted is movably provided in the axial direction of the carriage shaft 5 attached to a device main body 4.

Further, since the driving force of a driving motor 6 is transmitted to the carriage 3 via a plurality of gears not shown and a timing belt the carriage 3 on which the recording head 1 is mounted is moved along the carriage shaft 5. Further, a transport roller 8 is provided on the device main body 4 as a transport unit, and a recording sheet B which is a recording medium such as paper is transported by the transport, roller B. Further, the transport unit that transports the recording sheet S is not, limited to the transport roller, and a belt, a drum, or the like may be employed.

In such an ink jet recording device I, the recording sheet S is transported in the +X direction with respect to the recording head 1, ink droplets are elected from the recording head 1 while the carriage 3 is reciprocated in a direction along the Y-axis with respect to the recording sheet B, and thus landing of the ink droplets, that is, printing is performed on substantially entire surface of the recording sheet S.

Further, in the ink jet, recording device I described above, the example in which the recording head 1 is mounted on the carriage 3 and reciprocated in the Y direction which is the main scanning direction has been described, but the configuration is not particularly limited thereto. For example, the present disclosure can be applied to a so-called line type recording device that performs printing by fixing the recording head 3 and moving the recording sheet S such as paper only in the X direction which is the sub-scanning direction.

Further, in the present embodiment, the ink jet recording head has been described as an example of the liquid electing head and the ink jet recording device has been described as an example of the liquid ejecting apparatus, but the present disclosure is used far a wide variety of liquid electing heads and liquid electing apparatuses and can also be applied to a liquid electing head or a liquid ejecting apparatus that elects a liquid other than an ink. Examples of other liquid ejecting heads include various recording heads used for image recording devices such as printers, coloring material ejecting heads used for production of color filters such as liquid crystal displays, electrode: material electing heads used far forming electrodes, such as organic EL displays or field emission displays (FED), and bioorganic substance electing heads used for bio chip production, and the present disclosure can be applied to liquid electing apparatuses including a liquid ejecting head.

Further, the present disclosure is not limited to the flow passage forming member used for the liquid ejecting head reprasantad by the ink jet recording head and can also be applied to the flow passage forming marber used for other device

What is claimed is:

1. A flow passage forming member comprising a flow passage forming member main body that is formed of a resin material and defines at least a part of a flow passage;

a metal protective film that is provided on a surface of the flow passage forming member main body defining at least the flow passage and is formed of a metal material; and a protective film that is laminated on the metal protective film and contains an oxide or a nitride of at least one element selected from the group consisting of tantalum (Ta), titanium (Ti), zirconium (Zr), niobium (Nb), vanadium (V), hafnium (Hf), silicon (Si), aluminum (Al), tungsten (W), and yttrium (Y).

2. The flow passage forming member according to claim 1, wherein the protective film contains silicon (Si).

3. The flow passage forming member according to claim 1, wherein the metal protective film has a thickness greater than a thickness of the protective film.

4. The flow passage forming member according to claim 1, wherein the resin material contains a particle that is not a resin.

5. The flow passage forming member according to claim 1, wherein the metal protective film has a thickness of 1 μm or greater.

6. The flow passage forming member according to claim 1, wherein the protective film contains hafnium (Hf).

7. The flow passage forming member according to claim 1, wherein the metal protective film contains copper (Cu).

8. The flow passage forming member according to claim 1, wherein the metal protective film contains at least one of nickel phosphorus (Ni—P) nickel boron (Ni—B).

9. The flow passage forming member according to claim 1, wherein the metal protective layer includes an upper layer provided on a side of the protective film and a lower layer provided on a side of the flaw passage: forming member main body with respect to the upper layer, and the upper layer has a Mohs hardness greater than a Mohs hardness of the lower layer.

10. The lower passage forming member according to claim 9, wherein the lower layer contains copper (Cu), and the upper layer contains at least one of nickel Ni) or chromium (Cr).

11. The flow passage forming member according to claim 1, wherein the flow passage is formed at a groove provided on the flow passage forming member main body, the groove has an aspect ratio of 2 or greater which i obtained by dividing a depth by an inlet diameter, and the metal protective film on a side closest to the flow passage forming member main body contains at least one of nickel phosphorus (Ni—P) or nickel boron (Ni—B).

12. A liquid ejecting head comprising:

the flow passage forming member according to claim 1.

13. The liquid ejecting head according to claim 12, comprising:

a plurality of nozzles ejecting a liquid; and an individual flow passage provided for each of the nozzles, wherein the flow passage of the flow passage forming member is at least a part of a common liquid chamber commonly communicating with a plurality of the individual flow passages.

14. A liquid ejecting apparatus comprising:

the liquid ejecting head according to claim 12.

* * * * *